US009493209B2

(12) United States Patent
Sakaue

(10) Patent No.: US 9,493,209 B2
(45) Date of Patent: Nov. 15, 2016

(54) BICYCLE PEDAL, CLEAT AND BICYCLE PEDAL SYSTEM

(71) Applicant: Shimano Inc., Sakai, Osaka (JP)

(72) Inventor: Atsushi Sakaue, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/621,431

(22) Filed: Feb. 13, 2015

(65) Prior Publication Data

US 2015/0298763 A1 Oct. 22, 2015

(30) Foreign Application Priority Data

Apr. 22, 2014 (JP) ................................ 2014-087956
Aug. 18, 2014 (JP) ................................ 2014-165920

(51) Int. Cl.
*B62M 3/00* (2006.01)
*B62M 3/08* (2006.01)
*A43B 5/14* (2006.01)

(52) U.S. Cl.
CPC ................ *B62M 3/086* (2013.01); *A43B 5/14* (2013.01)

(58) Field of Classification Search
CPC ......... B62M 3/08; B62M 3/086; A43B 5/14; Y10T 74/217
See application file for complete search history.

(56) References Cited

U.S. PATENT DOCUMENTS 4,488,453 A * 12/1984 Drugeon ................ B62M 3/086 36/131
4,738,158 A * 4/1988 Christol .................. A43B 5/14 36/131
5,048,369 A * 9/1991 Chen ...................... B62M 3/086 74/594.6
6,205,885 B1 * 3/2001 Hermansen ............ B62M 3/086 74/594.6
7,024,962 B2 * 4/2006 Chen ...................... B62M 3/086 36/131
7,258,042 B2 * 8/2007 Couturet ................ B62M 3/086 74/594.4
7,743,682 B2 * 6/2010 Couturet ................ B62M 3/086 74/594.6
8,065,933 B2 11/2011 Coderre
8,549,958 B2 * 10/2013 Bouchez ................ B62M 3/086 74/594.1
2005/0204860 A1 * 9/2005 Winefordner ............ B62M 3/00 74/594.1
2011/0290070 A1 * 12/2011 Lin ........................ B62M 3/086 74/594.4
2012/0047772 A1 * 3/2012 Lin .......................... A43B 5/14 36/134
2012/0132030 A1 5/2012 Kamada

FOREIGN PATENT DOCUMENTS

EP 0 664 252 A1 7/1995
EP 0 826 586 A1 3/1998
FR 2 809 701 A1 12/2001
GB 2 266 687 A 10/1993
JP 55-160677 A 12/1980
JP 62-120291 A 6/1987
JP 64-70286 A 3/1989
JP 3-34987 U 4/1991

* cited by examiner

*Primary Examiner* — Adam D Rogers
(74) *Attorney, Agent, or Firm* — Global IP Counselors

(57) ABSTRACT

A bicycle pedal is detachable and engageable with a cleat that can be attached to shoes. The bicycle pedal basically includes a pedal shaft having a rotational center axis, a pedal main body and a clamp part. The pedal main body includes a first surface and a second surface. The second surface is on the opposite side of the first surface. The pedal main body is rotatably supported by the pedal shaft around the rotational center axis. The clamp part has at least three cleat clamping portions that detachably retain the cleat on at least the first surface of the pedal main body.

31 Claims, 15 Drawing Sheets

6 10 50 C2 30e 42a 34 22a 32 36 34 38c 30c 22 30d 24 30e 38a 36 30a 30d 40c 40a 32a 34a C1 30e 22d 22b 36 42b 30d 30b 40b 22c

BICYCLE PEDAL, CLEAT AND BICYCLE PEDAL SYSTEM

CROSS-REFERENCE TO RELATED APPLICATIONS

This application claims priority to Japanese Patent Application No. 2014-087956, filed on Apr. 22, 2014 and Japanese Patent Application No. 2014-165920, filed on Aug. 18, 2014. The entire disclosures of Japanese Patent Application Nos. 2014-087956 and 2014-165920 are hereby incorporated herein by reference.

BACKGROUND

Field of the Invention

This invention generally relates to a bicycle pedal that is detachable and engageable with a cleat. This invention also relates a cleat that can be attached to shoe, and a bicycle pedal system comprising a cleat and a bicycle pedal.

Background Information

It is known to have a bicycle pedal system that uses cleats, in which a cleat can be attached to a shoe and a bicycle pedal detachably engages the cleat (see, for example, EP Patent Application Publication No. 0826586). A conventional bicycle pedal comprises a pedal shaft, a pedal main body that is rotatably supported by the pedal shaft and a clamp part having two cleat clamping portions disposed at an interval longitudinally along the traveling direction of the bicycle in the pedal main body. In this kind of pedal system, not only can the pedal be pushed down, but the pedal can also be pulled up, so that the pedal can be stably and efficiently operated.

SUMMARY

Generally, the present disclosure is directed to various features of a pedal and a cleat that is used with the pedal. In one feature, a pedal is disclosed that can retain a cleat even more stably than a conventional pedal system.

One object of the present invention is to provide a bicycle pedal, a cleat and a bicycle pedal system that are able to more stably retain a cleat to the pedal.

In view of the state of the known technology and in accordance with a first aspect of the present disclosure, a bicycle pedal is provided that is detachable and engageable with a cleat that can be attached to a shoe. The bicycle pedal comprises a pedal shaft having a rotational center axis, a pedal main body and a clamp part. The pedal main body comprises a first surface and a second surface that is on the opposite side of the first surface. The pedal main body is rotatably supported by the pedal shaft around the rotational center axis. The clamp part has at least three cleat clamping portions that detachably retain the cleat on at least the first surface of the pedal main body.

In this bicycle pedal, the cleat is detachably retained by three or more cleat clamping portions. For this reason, the gap in the three or more cleat clamping portions can be increased, and the pedal clamping portion can retain the cleat in a plane at three or more positions. As a result, the shoe to which the cleat is attached becomes less likely to be tilted, and the pedaling force of the rider can be efficiently transmitted to the pedal. With this, the pedal can be operated more stably and efficiently.

The clamp part can comprise a first cleat clamping portion, a second cleat clamping portion and a third cleat clamping portion. The third cleat clamping portion is disposed away from the second cleat clamping portion along the rotational center axis direction. The pedal shaft is disposed to extend between the first cleat clamping portion and the second cleat clamping portion. In this case, since the cleat is retained by the first cleat clamping portion to the third cleat clamping portion, which are provided in three locations, the interval for retaining the cleat can be made larger when compared to the conventional case in which the cleat is only retained in two locations. For this reason, the pedaling force of the rider can be even more efficiently transmitted, and the pedal can be more stably and efficiently operated.

The third cleat clamping portion can be disposed on a side having the second cleat clamping portion with respect to the pedal shaft. In this case, since the first cleat clamping portion, the second cleat clamping portion and the third cleat clamping portion are disposed sandwiching the pedal shaft, the interval for retaining the cleat can be increased in the longitudinal direction.

The third cleat clamping portion can be disposed between the first cleat clamping portion and the second cleat clamping portion as seen from the rotational center axis direction. In this case, since the third cleat clamping portion is disposed between the first cleat clamping portion and the second cleat clamping portion, the interval for retaining the cleat can be increased in the lateral direction.

The third cleat clamping portion can be disposed in a position that straddles the rotational center axis as seen from a direction that is perpendicular to a first surface. In this case, the third cleat clamping portion can be disposed in an intermediate position of the first cleat clamping portion and the second cleat clamping portion as seen from the rotational center axis by disposing the first cleat clamping portion and the second cleat clamping portion in a line symmetrically with respect to the rotational center axis. As a result, the interval for retaining the cleat can be increased in the lateral direction. With this, a shoe becomes less likely to be tilted in the lateral direction, and the pedaling force can be more efficiently transmitted to the bicycle pedal. For this reason, the pedal can be operated more stably and efficiently.

The pedal shaft can comprise a first end that is attached to a bicycle crank and a second end that is on an opposite side of the first end along the rotational center axis direction. The third cleat clamping portion can be disposed on a side having the second end with respect to the first and second cleat clamping portions. In this case, since the third cleat clamping portion can be offset from the first and second cleat clamping portions in the lateral direction, the cleat becomes even less likely to be tilted in the lateral direction, and the pedal can be operated more stably and efficiently.

The third cleat clamping portion can comprise a retaining portion that is engageable with the cleat, and a recess that faces the retaining portion. In this case, since the recess is formed in a portion that faces the retaining portion, clearance from the ground can be realized with this recess even if the bicycle is tilted when turning corners, etc.

The retaining portion can be disposed in a position that is offset from the first surface in a direction that intersects with the first surface. In this case, placing the cleat into the gap between the retaining portion and the first surface becomes easy.

The retaining portion can have a thickness that is less than the thickness of the pedal main body in the topmost portion. In this case, since the thickness of the retaining portion is less than the thickness of the topmost portion of the pedal main body, the cleat can be inserted into the thickness difference portion.

The retaining portion can comprise an engagement surface that is configured to contact with the cleat. The recess is formed in a portion that faces the engagement surface. In this case, since the cleat is in contact with the engagement surface at the gap between the retaining portion and the first surface, the cleat can be reliably retained.

The engagement surface can be disposed in a position that is offset from the first surface in a direction that intersects with the first surface. In this case, since the engagement surface is disposed in a position that is offset from the first surface in a direction that intersects with the first surface, a gap is formed between the engagement surface and the first surface on which the cleat is set. For this reason, the cleat can be easily put in contact with the engagement surface.

The third cleat clamping portion can also comprise a connecting portion that connects the retaining portion and the pedal main body. The connecting portion can be inclined with respect to the first surface and can extend along the rotational center axis direction. In this case, since the inclined connecting portion connects the retaining portion and the pedal main body, clearance from the ground can be realized by the connecting portion, even if the bicycle is tilted.

The connecting portion can also connect the two ends of the retaining portion and the pedal main body. In this case, the cleat can be inserted into the retaining portion between the connecting portion.

The third cleat clamping portion can also be integrally formed with the pedal main body. In this case, the rigidity of the third cleat clamping portion increases.

The third cleat clamping portion can also be formed between the retaining portion and the pedal main body and can comprise an opening into which the cleat is inserted. In this case, the cleat can be easily inserted into the retaining portion.

The third cleat clamping portion can also be non-rotatably coupled to the pedal main body. In this case, the rigidity of the third cleat clamping portion increases.

Either the first cleat clamping portion, the second cleat clamping portion, or the third cleat clamping portion can also be rotatably provided. In this case, since one of the three cleat clamping portions rotates, the cleat can be easily disengaged from the cleat clamping portion.

The first cleat clamping portion, the second cleat clamping portion, and the third cleat clamping portion can also be rotatably provided. In this case, since all of the cleat clamping portions rotate, the cleat can be more easily disengaged from the three cleat clamping portions.

The clamp part can also comprise three biasing members that bias the first cleat clamping portion, the second cleat clamping portion, and the third cleat clamping portion in a direction that retains the cleat. In this case, since the three cleat clamping portions are biased in a direction that retains the cleat within the biasing member, the cleat is less likely to be disengaged from the cleat clamping portion during pedaling, especially when pulling the pedal up.

The pedal main body can also comprise a first protrusion that protrudes from the first surface. In this case, the cleat becomes less likely to move in the longitudinal direction and the lateral direction due to the engagement of the cleat with the first protrusion.

The first protrusion can have a partially spherical or conical side surface. In this case, when the cleat approaches the first protrusion, the cleat will gradually move in a direction away from the first surface. Therefore, detaching the cleat will become easier.

The pedal main body can protrude from the first surface and can have a second protrusion that extends along the rotational center axis direction. In this case, detaching the cleat becomes easier by letting the cleat ride on the second protrusion.

The first protrusion can be provided in an intermediate portion of the second protrusion along the rotational center axis direction and can protrude with respect to the side surface of the second protrusion. In this case, the cleat will ride on the second protrusion by turning the cleat about the first protrusion, and the cleat will separate from the first surface. For this reason, the cleat can be easily detached from the cleat clamping portion with only a slight twisting operation of the shoes.

The pedal main body can also comprise an inclined surface that inclines from the second protrusion toward the first surface in a direction away from the pedal shaft. In this case, since an inclined surface is provided to the second protrusion, the cleat will gradually separate from the first surface due to the inclined surface when the shoe is turned about the first protrusion. For this reason, the cleat can be more easily detached from the cleat clamping portion.

The pedal shaft can also comprise a first end portion that is attached to the bicycle crank and a second end portion that is on the opposite side of the first end portion along the rotational center axis direction. The inclined surface can be provided to a side having the first end portion with respect to the first protrusion. In this case, since the inclined surface is provided to a side having the first end portion that is attached to the crank with respect to the first protrusion, the cleat will move in a direction away from the first surface due to the inclined surface by turning the cleat in either direction with respect to the first protrusion.

The first cleat clamping portion, the second cleat clamping portion, and the third cleat clamping portion can each comprise an engagement surface that is in contact with the cleat. The engagement surface can be positioned between the first surface and the endmost portion of the first protrusion in the direction that is perpendicular to the first surface. In this case, since the position of the retaining portion of the cleat will be in a position that is lower than the first protrusion with respect to the first surface, the pedals can be configured to be thinner.

The first cleat clamping portion, the second cleat clamping portion, and the third cleat clamping portion can also be disposed in the periphery of the pedal main body. In this case, the gap in each of the cleat clamping portions can be increased. As a result, since the three cleat clamping portions are disposed in the periphery of the pedal main body, the gaps in the three cleat clamping portions can be increased.

A cleat according to another aspect of the present invention detachably engages a clamp part that is attached to the pedal main body of the bicycle pedal. The cleat comprises a first engagement portion, a second engagement portion and a third engagement portion. The first engagement portion is configured to detachably engage the clamp part. The second engagement portion configured to detachably engage the clamp part in a position that is on the opposite side of the first engagement portion, with respect to the pedal shaft of the bicycle pedal. The third engagement portion detachably engages the clamp part in a position away from the second engagement portion along the rotational center axis direction of the pedal shaft.

Since the cleat engages the clamp part at three engagement portions, the gap in the three engagement portions can be increased, and the cleat can be retained in a plane at three positions. For this reason, the shoe to which the cleat is attached becomes less likely to be tilted, and the pedaling force of the rider can be efficiently transmitted to the pedal. With this, the pedal can be operated more stably and efficiently.

The third engagement portion can also engage the clamp part on a side having the second engagement portion with respect to the pedal shaft. In this case, since the first engagement portion, the second engagement portion and the third engagement portion are disposed sandwiching the pedal shaft, the gap for retaining the cleat can be increased in the longitudinal direction.

The third engagement portion can also engage the clamp part in a position between the first engagement portion and the second engagement portion as seen from the rotational center axis direction. In this case, since the third engagement portion is disposed between the first engagement portion and the second engagement portion, as seen from the rotational center axis direction, the interval for retaining the cleat can be increased in the lateral direction.

The cleat can be spherical or conical and can further comprise an abutting surface that abuts a part of the pedal main body. The abutting surface partially forms a spherical shape or a conical shape. In this case, since the cleat is in contact with a part of the main body at a spherical or a conical abutting surface, tilting the cleat with respect to the pedal main body when detaching the cleat from the clamp part becomes easy; therefore, detaching the cleat becomes easy.

The first engagement portion, the second engagement portion, and the third engagement portion can also be provided in the peripheral portion of the cleat. In this case, since the three engagement portions are disposed in the peripheral portion of the cleat, the interval of the three engagement portions can be increased.

A cleat according to yet another aspect of the present invention can be attached to a first surface that faces the shoe of the pedal main body of the bicycle pedal. The cleat comprises a first attaching portion, a second attaching portion, a connecting portion and an abutting surface. The first attaching portion is attached to the first surface. The second attaching portion is attached to the first surface on the opposite side of the first attaching portion, with respect to the pedal shaft of the bicycle pedal. The connecting portion is configured to be a connecting portion that connects the first attaching portion and the second attaching portion so that an interval is formed between the first attaching portion and the second attaching portion in which a part of the pedal main body is disposed; the abutting surface has a spherical or conical shape, and abuts a part of the pedal main body between the first attaching portion and the second attaching portion.

In these cleat, the first attaching portion and the second attaching portion are disposed sandwiching the pedal shaft, and the first attaching portion and the second attaching portion are connected by the connecting portion so that a part of the pedal main body is disposed. Additionally, the abutting surface that abuts a part of the pedal main body between the first attaching portion and the second attaching portion has a spherical or conical shape. For this reason, tilting the cleat with respect to the pedal main body when detaching the cleat from the clamp part becomes easy; therefore, detaching the cleat becomes easy.

The bicycle pedal system according to another aspect of the present invention comprises the above-described bicycle pedal and the above-described cleat.

According to the present invention, a bicycle pedal, a cleat, and a bicycle pedal system that are able to more stably retain a cleat to the pedal can be provided.

Also other objects, features, aspects and advantages of the disclosed pedal and the disclosed cleat will become apparent to those skilled in the art from the following detailed description, which, taken in conjunction with the annexed drawings, discloses selected embodiments of the disclosed pedal and the disclosed cleat.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
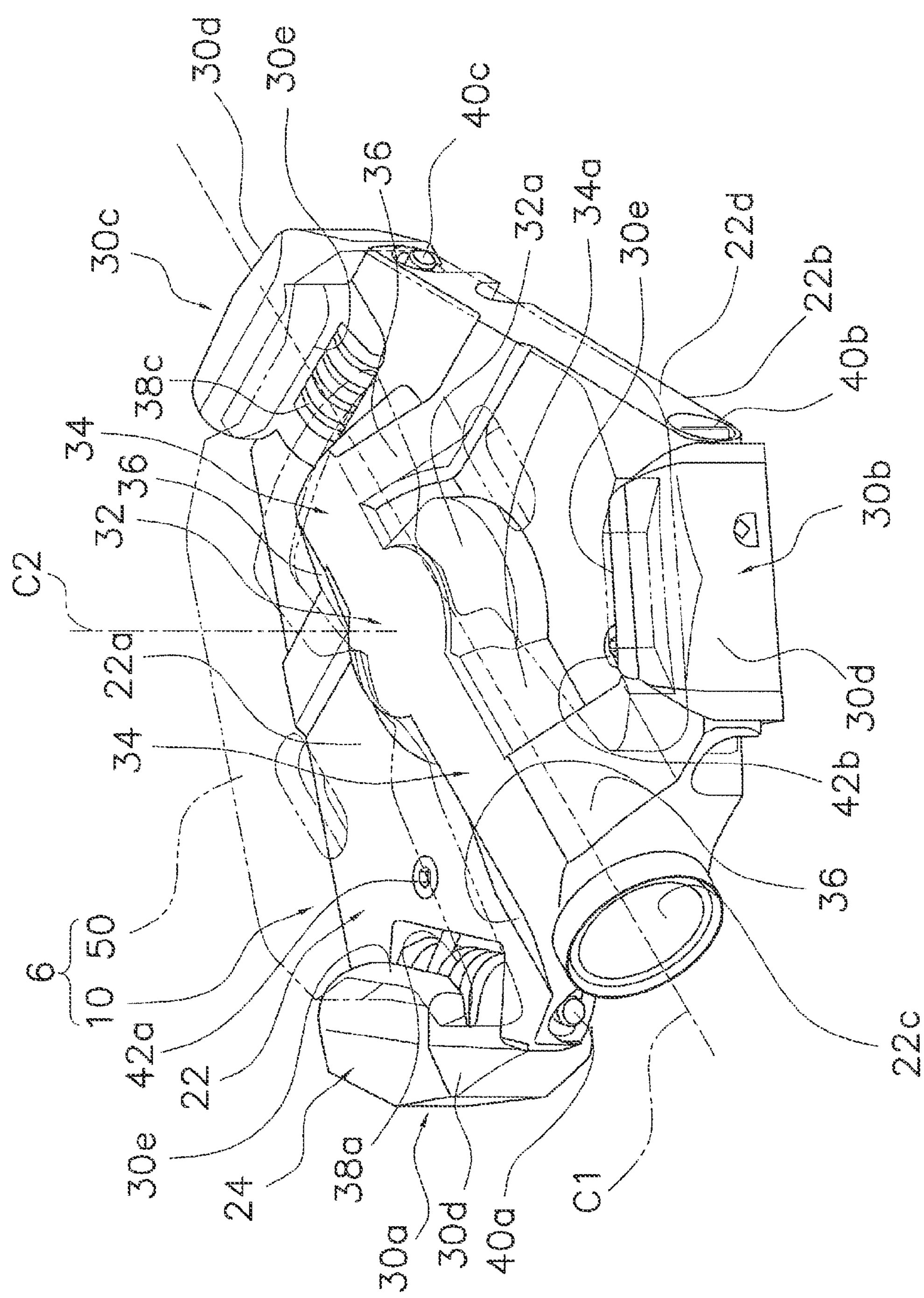
FIG. 1 is a top perspective view of a bicycle pedal in accordance with a first embodiment.
Figure 2:
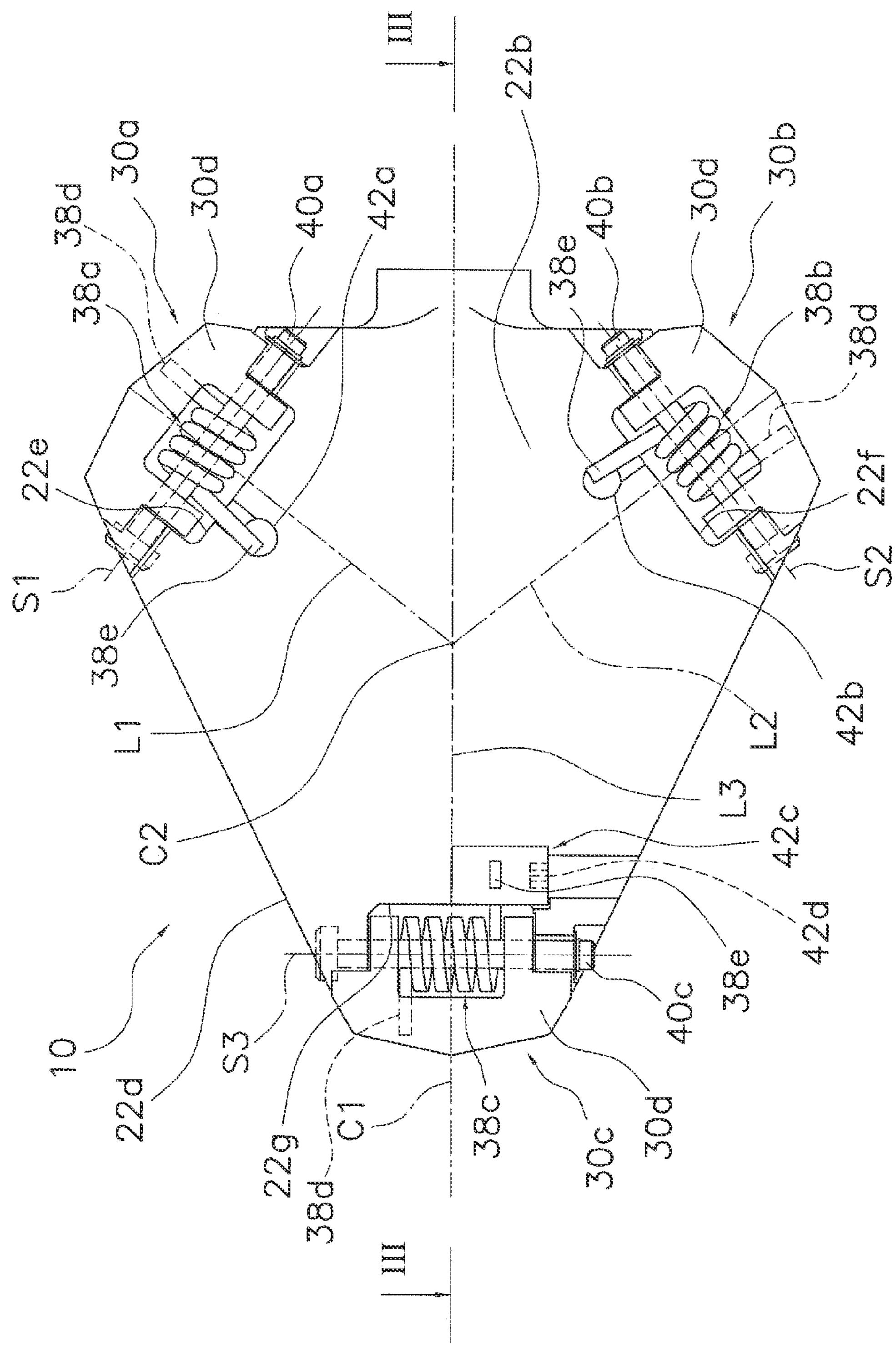
FIG. 2 is a bottom plan view of the bicycle pedal illustrated in FIG. 1 in accordance with the first embodiment.
Figure 3:
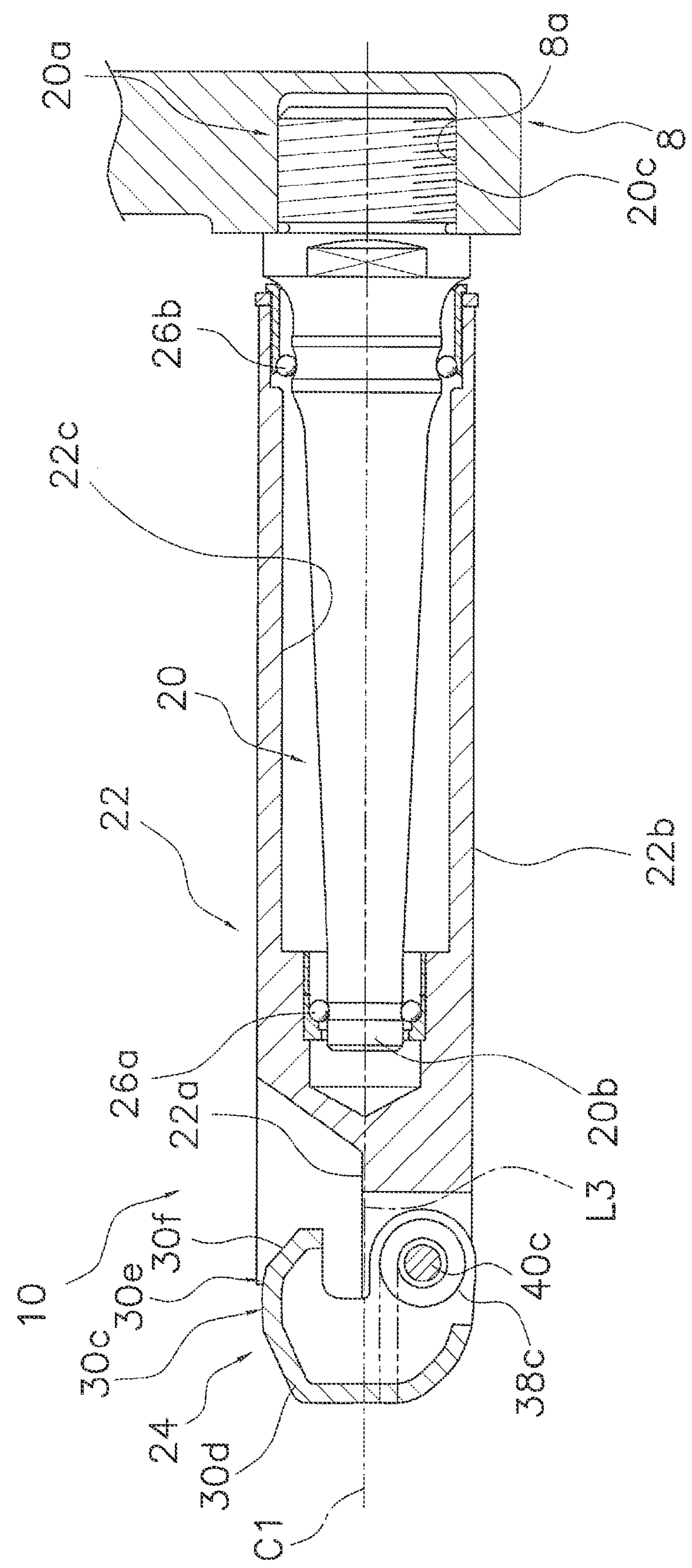
FIG. 3 is a cross-sectional view of the bicycle pedal illustrated in FIGS. 1 and 2 taken along the section line III-III in FIG. 2.

Referring initially to FIG. 1, a bicycle pedal 10 is illustrated in accordance with a first embodiment. In FIGS. 1, 2 and 3, the bicycle pedal 10 (hereinafter referred to as pedal) is detachably engaged with a cleat 50 that is attached to a shoe. A bicycle pedal system 6 is configured by the pedal 10 and the cleat 50. Meanwhile, "front," "rear," "left," "right," "up," "down" are synonymous with the terms "front," "rear," "left," "right," "up," and "down," as seen from a state in which the rider is sitting on the saddle while facing the handlebars (none of which is diagrammed).

Pedal

The pedal 10 comprises a pedal shaft 20 having a rotational center axis C1 (refer to FIG. 3), a pedal main body 22 that is rotatably supported by the pedal shaft 20, and a clamp part 24 having three or more cleat clamping portions that are provided to the pedal main body 22 and that retain the cleat 50.

As shown in FIG. 3, the pedal shaft 20 is housed in a shaft housing space 22*c* of the pedal main body 22, as mentioned below. The pedal shaft 20 rotatably supports the pedal main body 22 around the rotational center axis C1 that extends through a center of the pedal shaft 20 in a longitudinal direction via a pair of rolling bearings 26*a* and 26*b*. The pedal shaft comprises a first end portion 20*a* and a second end portion 20*b*. The first end portion 20*a* is attached to the bicycle crank 8. The second end portion 20*b* is on the opposite side of the first end portion 20*a* in the rotational center axis C1 direction. A male threaded portion 20*c* is provided to the second end portion 20*b*. The male threaded portion 20*c* is screwed into a screw hole 8*a* that is provided to the crank 8. The pedal shaft 20 is an axis with a real body, i.e., a shaft member, and the rotational center axis C1 is a virtual axis line. Meanwhile, in FIGS. 1 and 2, the drawing of the pedal shaft 20 has been omitted.

As shown in FIG. 2, the pedal main body 22 is a plate-like member made of metal or synthetic resin. The pedal main body 22 has a roughly isosceles triangular shape when seen from the bottom. The pedal main body 22 comprises a first surface 22*a*, a second surface 22*b* and a stepped cylindrical shaft housing space 22*c*. The first surface 22*a* faces the shoe. The second surface 22*b* is disposed on the opposite side of the first surface 22*a*. The stepped cylindrical shaft housing space 22*c* (refer to FIGS. 1 and 3) houses the pedal shaft 20.

As shown in FIG. 1, the pedal main body 22 comprises a first protrusion 32, a second protrusion 34, and at least one inclined surface 36 (two inclined surfaces 36 in this embodiment). The first protrusion 32 protrudes from the first surface 22*a*. The first protrusion 32 is disposed in a position that straddles the rotational center axis C1 when seen from a direction that is perpendicular to the first surface 22*a*. The first protrusion 32 is disposed on the cleat rotational axis C2. The cleat rotational axis C2 is a central axis of the rotation operation when detaching the cleat 50 from the pedal 10 and extends in a direction that is perpendicular to the first surface 22*a*. The first protrusion 32 comprises spherical or conical side surfaces 32*a*. In the first embodiment, the side surfaces 32*a* are partially conical. However, these surfaces can also have a partially spherical or a partially cylindrical surface shape.

The second protrusion 34 protrudes from the first surface 22*a* and extends in the rotational center axis C1 direction. The second protrusion 34 is disposed in a position that straddles the rotational center axis C1 when seen from a direction that is perpendicular to the first surface 22*a*. The protruding direction of the second protrusion 34 with respect to the first protrusion 32 is a direction that is parallel to the first surface 22*a*. Specifically, the second protrusion 34 protrudes from both sides of the rotational center axis C1 direction with respect to the first protrusion 32. In other words, the first protrusion 32 is provided to the center portion of the second protrusion 34 in the rotational center axis C1 direction. Additionally, the first protrusion 32 protrudes in a direction that is parallel to the first surface 22*a* with respect to the side surface 34*a* of the second protrusion 34.

At least one inclined surface 36 is inclined in a direction that gradually separates from the pedal shaft 20, from the second protrusion 34 toward the first surface 22*a*. The two ends of the inclined surface 36 are both connected to the top surface of the second protrusion 34 and the first surface 22*a*. In the first embodiment, the inclined surfaces 36 are provided on a side having the first end portion 20*a* and the second end portion 20*b* of the pedal shaft 20, with respect to the first protrusion 32. In other words, the inclined surfaces 36 are disposed on both sides of the first protrusion 32 in the rotational center axis C1 direction. Additionally, the inclined surfaces 36 are inclined in a direction that gradually separates from the pedal shaft 20 from both sides of the direction that is perpendicular to the rotational center axis C1 of the second protrusion 34 toward the first surface 22*a*. Therefore, in the first embodiment, four inclined surfaces 36 are provided sandwiching the first protrusion 32.

As shown in FIGS. 1 and 2, the clamp part 24 comprises three cleat clamping portions. In particular, the clamp part 24 comprises a first cleat clamping portion 30*a*, a second cleat clamping portion 30*b*, and a third cleat clamping portion 30*c*. The third cleat clamping portion 30*c* is disposed separate from the first and second cleat clamping portions 30*a* and 30*b* in the rotational center axis C1 direction. Additionally, the clamp part 24 comprises a first biasing member 38*a*, a second biasing member 38*b* (refer to FIG. 2) and a third biasing member 38*c*. The first biasing member 38*a* biases the first cleat clamping portion 30*a* in a direction that retains the cleat 50. The second biasing member 38*b* biases the second cleat clamping portion 30*b* in a direction that retains the cleat 50. The third biasing member 38*c* biases the third cleat clamping portion 30*c* in a direction that retains the cleat 50.

As shown in FIG. 2, the first cleat clamping portion 30*a*, the second cleat clamping portion 30*b* and the third cleat clamping portion 30*c* are disposed in the peripheral portion 22*d* of the pedal main body 22. Specifically, the first cleat clamping portion 30*a*, the second cleat clamping portion 30*b* and the third cleat clamping portion 30*c* are separately disposed in a first mounting recess 22*e*, a second mounting recess 22*f* and a third mounting recess 22*g* that are disposed in three corners of the pedal main body 22. The first mounting recess 22*e* to the third mounting recess 22*g* are formed to be recessed inwards in a roughly rectangular shape that extends through the first surface 22*a* and the second surface 22*b*.

The first cleat clamping portion 30*a* and the second cleat clamping portion 30*b* are disposed sandwiching the pedal shaft 20 so that the pedal shaft 20 extends between them. Specifically, the first cleat clamping portion 30*a* and the second cleat clamping portion 30*b* are disposed so that they are in line symmetrically with respect to the rotational center axis C1. The third cleat clamping portion 30*c* is disposed between the first cleat clamping portion 30*a* and the second cleat clamping portion 30*b* when seen from the rotational center axis C1 direction. In the first embodiment, the third cleat clamping portion 30*c* is disposed in the intermediate position of the first cleat clamping portion 30*a* and the second cleat clamping portion 30*b* when seen from the rotational center axis C1 direction. That is, the third cleat clamping portion 30*c* is disposed on the rotational center axis C1. The third cleat clamping portion 30*c* is also disposed further on a side having the second end portion 20*b* than the first cleat clamping portion 30*a* or the second cleat clamping portion 30*b*. Therefore, the third cleat clamping portion 30*c*, the first cleat clamping portion 30*a* and the second cleat clamping portion 30*b* are disposed at an interval in the rotational center axis C1 direction (in the lateral direction). Meanwhile, the first cleat clamping portion 30*a* and the second cleat clamping portion 30*b* can be disposed on a side having the second end portion 20*b*, and the third cleat clamping portion 30*c* can be disposed on a side having the first end portion 20*a*.

As shown in FIG. 2, the first cleat clamping portion 30*a* is rotatably provided around a first axis S1 by a first shaft member 40*a* that is disposed to the pedal main body 22 in the first mounting recess 22*e* along the first axis S1 direction. The first axis S1 extends in a direction that is parallel to the first surface 22*a*, as well as in a direction that intersects with a first straight line L1, which extends in the radial direction from the cleat rotational axis C2 toward the first cleat clamping portion 30*a*. Preferably, the first axis S1 extends in a direction that is essentially perpendicular to the first straight line L1.

The second cleat clamping portion 30*b* is rotatably provided around a second axis S2 by a second shaft member 40*b* that is disposed to the pedal main body 22 in the second mounting recess 22*f* along the second axis S2 direction. The second axis S2 extends in a direction that is parallel to the first surface 22*a*, as well as in a direction that intersects with a second straight line L2, which extends in the radial direction from the cleat rotational axis C2 toward the second cleat clamping portion 30*b*. Preferably, the second axis S2 extends in a direction that is essentially perpendicular to the second straight line L2. The second straight line L2 is disposed in a line symmetrical with the first straight line L1 with respect to the rotational center axis C1.

The third cleat clamping portion 30*c* is rotatably provided to the pedal main body 22 around a third axis S3 by a third shaft member 40*c* that is disposed in the third mounting recess 22*g* along the third axis S2 direction. The third axis S3 extends in a direction that is parallel to the first surface 22*a*, as well as in a direction that intersects with a third straight line L3, which extends in the radial direction from the cleat rotational axis C2 toward the third cleat clamping portion 30*c*. In the first embodiment, the third straight line L3 matches the rotational center axis C1 that passes through the cleat rotational axis C2. Preferably, the third straight line S3 extends in a direction that is essentially perpendicular with respect to the rotational center axis C1. Here, the first shaft member 40*a*, the second shaft member 40*b*, and the third shaft member 40*c* are a real bodies (the shaft members) in the same way as the pedal shaft 20, and are stopped by retaining rings that are not illustrated. The first axis S1, the second axis S2, and the third axis S3 are virtual axis lines in the same way as the rotational center axis C1.

As shown in FIGS. 1 and 2, the first cleat clamping portion 30*a*, the second cleat clamping portion 30*b*, and the third cleat clamping portion 30*c* each comprise a main body portion 30*d* and a retaining portion 30*e*. The retaining portions 30*e* retain the cleat 50. The main body portions 30*d* are rotatably supported by the pedal main body 22. The retaining portions 30*e* protrude from the main body portions 30*d* toward the first protrusion 32. The main body portions 30*d* are disposed with an interval that is able to retain the cleat 50 between the first surface 22*a*. Each of the retaining portions 30*e* of the first cleat clamping portion 30*a*, the second cleat clamping portion 30*b*, and the third cleat clamping portion 30*c* is biased in a direction toward the center (the first protrusion 32) of the pedal main body 22 by the first biasing member 38*a*, the second biasing member 38*b*, and the third biasing member 38*c*, respectively. A guide surface 30*f* that inclines toward the first surface 22*a* is formed in the retaining portion 30*e*. The guide surface 30*f* is provided to pivot the retaining portion 30*e* in the opening direction (counterclockwise in FIG. 3) against the biasing force of one of the first biasing member 38*a* to the third biasing member 38*c*, when one of the first cleat clamping portion 30*a* to the third cleat clamping portion 30*c* is pressed with the cleat 50.

As shown in FIG. 2, the first biasing member 38*a* is, for example, a torsion coil spring made of a metal spring wire with a circular cross section. In the first biasing member 38*a*, the first end portion 38*d* is locked to the first cleat clamping portion 30*a*, and the second end portion 38*e* is in contact with the distal end of a first screw member 42*a* for adjusting the spring force (the biasing force). The second end portion 38*e* of the first biasing member 38*a* is disposed in a groove that is formed on the second surface 22*b* toward the distal end of the first screw member 42*a*. The first screw member 42*a* is, for example, a hexagon socket set screw. The first screw member 42*a* is screwed in a screw hole that is disposed extending through the pedal main body 22. The distal end position of the first screw member 42*a* on a side having the second surface 22*b* can be adjusted by turning the first screw member 42*a* with a tool, such as a hexagonal wrench, from a side having the first surface 22*a*. The spring force (the biasing force) of the first biasing member 38*a* becomes stronger by approaching the distal end position of the first screw member 42*a* to the second surface 22*b*.

The second biasing member 38*b* is a spring member made of metal wire with the same structure as the first biasing member 38*a*. In the second biasing member 38*b*, the first end portion 38*d* is locked to the second cleat clamping portion 30*b*, and the second end portion 38*e* is in contact with a second screw member 42*b* for adjusting the spring force (the biasing force). The second screw member 42*b* is a hexagon socket set screw like the first screw member 42*a*, and the protrusion amount on a side having the second surface 22*b* can be adjusted by a turning tool, such as a hexagonal wrench, from a side having the first surface 22*a*. If the protrusion amount of the second screw member 42*b* is increased, the spring force (the biasing force) of the second biasing member 38*b* becomes stronger.

The third biasing member 38*c* is, for example, a torsion coil spring made of a metal spring wire with a rectangular cross section. In the first embodiment, the first cleat clamping portion 30*a* and the second cleat clamping portion 30*b* are located adjacent on a side having the first end portion 20*a* of the pedal 10. In order to increase the retaining force on a side having the second end portion 20*b* for retaining the cleat 50 at one location of the third cleat clamping portion 30*c*, the biasing force of the third biasing member 38*c* is greater than the biasing force of the first biasing member 38*a* and the second biasing member 38*b*. However, the biasing members of the first biasing member 38*a* to the third biasing member 38*c* can be configured by those having the same biasing force. In the third biasing member 38*c*, the first end 38*d* is locked by the third cleat clamping portion 30*c*, and the second end 38*e* is locked by an adjustment member 42*c* for adjusting the spring force. The adjustment member 42 is, for example, a cylindrical member and is rotatably mounted to the second surface 22*b* around an axis that is parallel to the third axis S3. Formed on the outer peripheral surface of the adjustment member 42*c* are planar portions that cut away a part of the cylindrical surface at, for example, three locations in the circumferential direction; each of the planar portions is formed so that the distance to the center of the adjustment member 42 is different from each other. The second end portion 38*e* of the third biasing member 38*c* is selectively locked to the above-described plurality of planar portions of the adjustment member 42. The adjustment member 42*c* comprises a tool locking hole 42*d* to which tools such as a hexagonal wrench can be mounted. The planar portion that locks the second end portion 38*e* of the third biasing member 38*c* is changed by turning the adjustment member 42*c* by mounting a tool to this tool locking hole 42*d*, and the spring force (the biasing force) is changed.

Cleat

Figure 4:
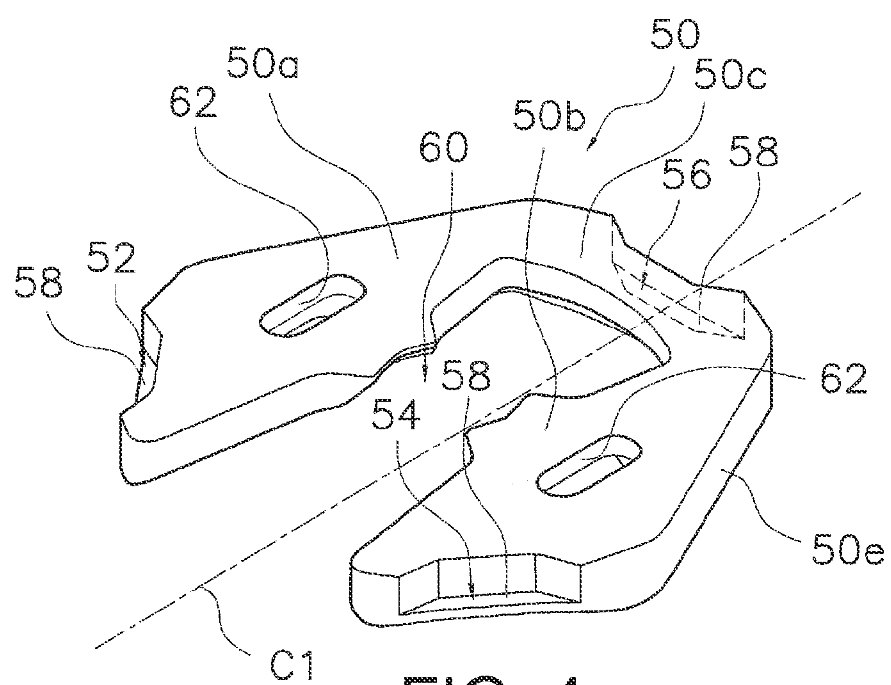
FIG. 4 is a top perspective view of a cleat that engages the pedal in accordance with the first embodiment.
Figure 5:
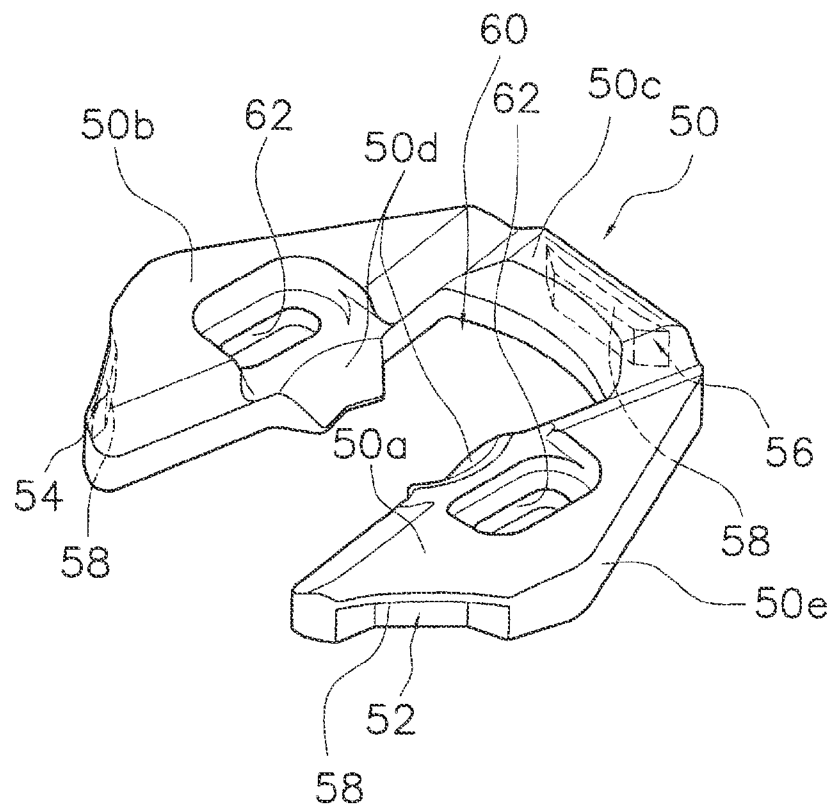
FIG. 5 is a bottom perspective view of the cleat illustrated in FIG. 4.

The cleat 50 is a plate-like member that is made of metal that has a roughly hexagonal shape. As shown in FIGS. 4 and 5, the cleat 50 comprises a first attaching portion 50*a*, a second attaching portion 50*b*, a connecting portion 50*c*, and a pair of abutting surfaces 50*d* that are attached to the first surface 22*a* of the pedal 10. The cleat 50 detachably engages the clamp part 24 that is attached to the pedal main body 22 of the pedal 10. The cleat 50 comprises a first engagement portion 52, a second engagement portion 54, and a third engagement portion 56, which detachably engages the clamp part 24.

The second attaching portion 50*b* is attached to the first surface 22*a* on the opposite side of the first attaching portion 50*a* with respect to the pedal shaft 20 of the pedal 10. The connecting portion 50*c* connects the first attaching portion 50*a* and the second attaching portion 50*b* to form a gap 60, in which a part of the pedal main body 22 is disposed between the first attaching portion 50*a* and the second attaching portion 50*b*. In the first embodiment, the connecting portion 50*c* is provided so that the first protrusion 32 and the second protrusion 34 as a part of the pedal main body 22 can be disposed in the gap 60.

The first engagement portion 52 is provided in the first attaching portion 50*a* and detachably engages the clamp part 24. The second engagement portion 54 detachably engages the clamp part 24 in a position that is on the opposite side of the first engagement portion 52, with respect to the pedal shaft 20 of the bicycle pedal 10. Therefore, the second engagement portion 54 is provided in the second attaching portion 50*b*. The third engagement portion 56 detachably engages the clamp part 24 in a position that is offset from the second engagement portion 54 along the rotational center axis C1 direction of the pedal shaft 20. In the first embodiment, the third engagement portion 56 can also engage the clamp part 24 in a position between the first engagement portion 52 and the second engagement portion 54, as seen from the rotational center axis C1 direction. In the first embodiment, the third engagement portion 56 is provided in the connecting portion 50*c*.

Specifically, the first engagement portion 52 engages the first cleat clamping portion 30*a* of the clamp part 24. The second engagement portion 54 engages the second cleat clamping portion 30*b* of the clamp part 24. The third engagement portion 56 engages the third cleat clamping portion 30*c* of the clamp part 24. The first engagement portion 52, the second engagement portion 54, and the third engagement portion 56 are provided in the peripheral portion 50*e* of the cleat 50. The first engagement portion 52, the second engagement portion 54, and the third engagement portion 56 all comprise an attaching recess 58 that is formed recessed from the peripheral portion 50*e* of the cleat 50. The attaching recess 58 is formed to be recessed in a flat isosceles trapezoid shape in a plan view. The thickness of the first engagement portion 52, the second engagement portion 54, and the third engagement portion 56 on a side having the peripheral portion 50*e* of the cleat 50 is slightly smaller than the gap between the retaining portion 30*e* of the clamp part 24 and the first surface 22*a*.

A pair of abutting surfaces 50*d* (refer to FIG. 5) are provided so that they abut a part of the pedal main body 22. The cleat 50 comprises a pair of long holes 62 for attaching, which are for attaching the cleat 50 to the shoes with a bolt member (not diagrammed). The abutting surfaces 50*d* have partially spherical, conical, or cylindrical shapes. In the first embodiment, the abutting surfaces 50*d* are partially conical shaped and abut the side surfaces 32*a* of the first protrusion 32 as a part of the pedal main body 22. The abutting surfaces 50*d* each have a side surface shape that corresponds to the side surfaces 32*a* of the first protrusion 32. The distal end portion of the pair of abutting surfaces 50*d* that are disposed opposing each other is formed in a flat V-shape. Meanwhile, in the case that the first protrusion 32 has a conical shape or a spherical shape, the abutting surface can have a cylindrical shape.

Attaching and Detaching Operation of the Cleat

In a bicycle pedal system 6 configured in this way, when attaching a shoe to the pedal 10, the shoe is disposed on the first surface 22*a* of the pedal main body 22 of the pedal 10 in a state in which the cleat 50 is attached to the shoe by a bolt member that is not diagrammed. Then, the first engagement portion 52 and the second engagement portion 54 are engaged with the first cleat clamping portion 30*a* and the second cleat clamping portion 30*b*. In this state, if the outside of the shoe (a side having the second end portion 20*b* of the pedal shaft 20) is strongly stepped into the pedal 10, the retaining portion 30*e* will open due to the action of the guide surface 30*f* of the retaining portion 30*e* of the third cleat clamping portion 30*c*, and the third engagement portion 56 of the cleat 50 will be clamped by the third cleat clamping portion 30*c*. In a state in which the cleat 50 is retained by the clamp part 24, the pair of abutting surfaces 50*d* will be contact with and will be disposed to the side surfaces 32*a* of the first protrusion 32. At this time, the cleat 50 will engage the pedal 10 at three positions, and the gap between the first cleat clamping portion 30*a* and the third cleat clamping portion 30*c*, as well as the gap between the second cleat clamping portion 30*b* and the third cleat clamping portion 30*c*, can be made larger than the width of a conventional lever member that engages the pedal at one position in the rear. For this reason, the cleat 50 can be retained to the pedal 10 more stably than with the prior art. Additionally, the shoe to which the cleat 50 is attached becomes less likely to be tilted, and the pedaling force of the rider can be efficiently transmitted to the pedal 10. With this, the pedal 10 can be operated more stably and efficiently. Meanwhile, as the attaching and detaching operation of the cleat 50, first engaging the third engagement portion 56 to the third cleat clamping portion 30*c* and then engaging the first engagement portion 52 and the second engagement portion 54 simultaneously to the first cleat clamping portion 30*a* and the second cleat clamping portion 30*b* by stepping onto the inner side of the pedal 10 is also possible.

When detaching the shoe from the pedal 10, the heel side of the shoe is slightly twisted outside. Then, since the abutting surfaces 50*d* abuts the side surfaces 32*a* of the first protrusion 32, the shoe rotates about the cleat rotational axis C2. At this time, the abutting surfaces 50*d* slides along the side surfaces 32*a*. When the shoe rotates, the corner of the opposing surface of the first attaching portion 50*a* and the second attaching portion 50*b* of the cleat 50 will ride on the inclined surface 36. With this, the cleat 50 is separated from the first surface 22*a* of the pedal 10, and the third cleat clamping portion 30*c* will be pushed up from the first cleat clamping portion 30*a* to be opened. As a result, the cleat 50 will be detached from the pedal 10, and the shoe can be detached from the pedal 10. By making the side surface shapes of the abutting surfaces 50*d* and the side surfaces 32*a* partially spherical or conical, when the cleat 50 start to separate from the first surface 22*a*, the cleat 50 is moved in a direction that intersects with the cleat rotational axis C2 along the side surfaces 32*a*, and the cleat 50 can be easily detached from the pedal 10.

Second Embodiment

Figure 6:
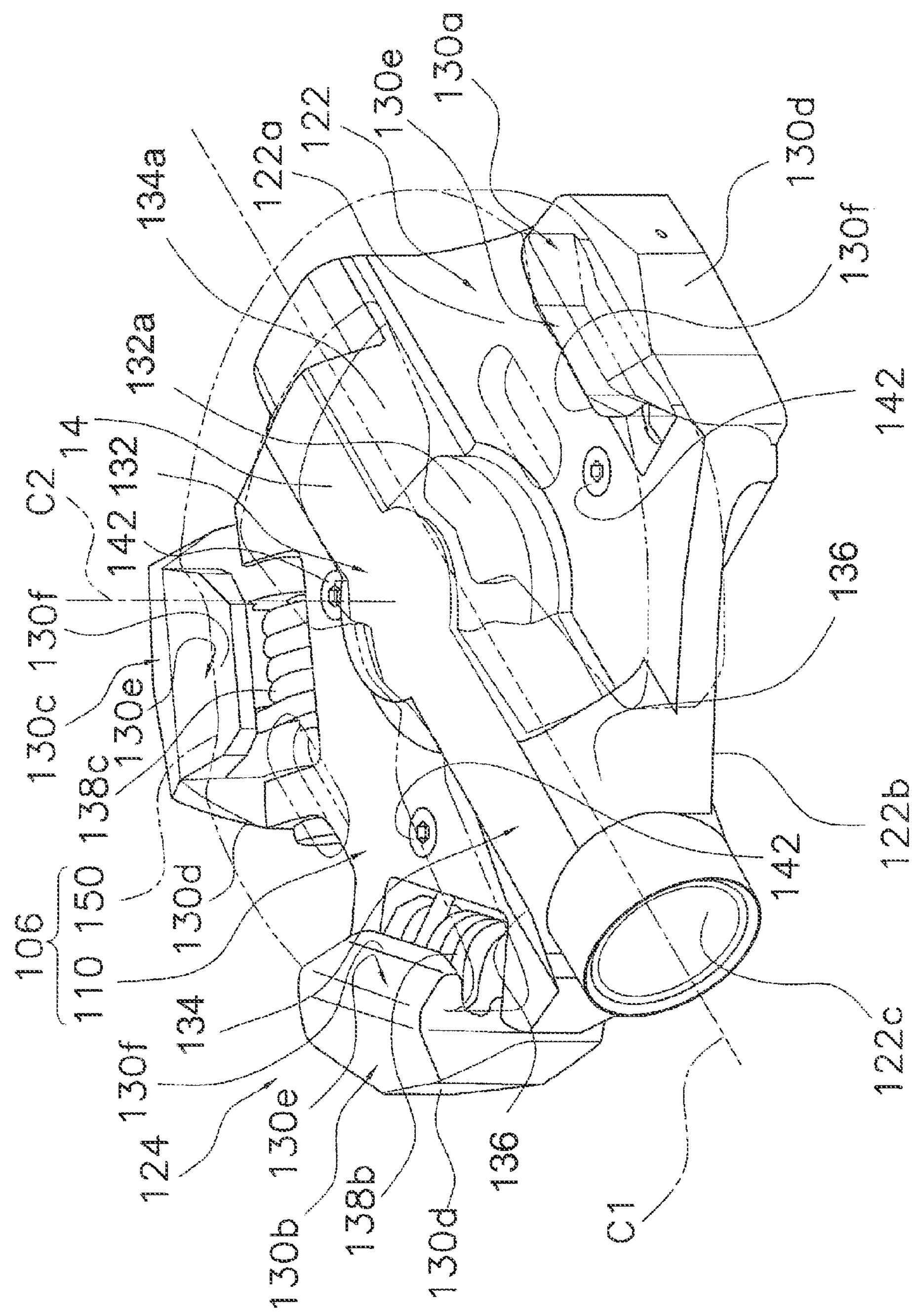
FIG. 6 is a top perspective view of a bicycle pedal in accordance with a second embodiment.
Figure 7:
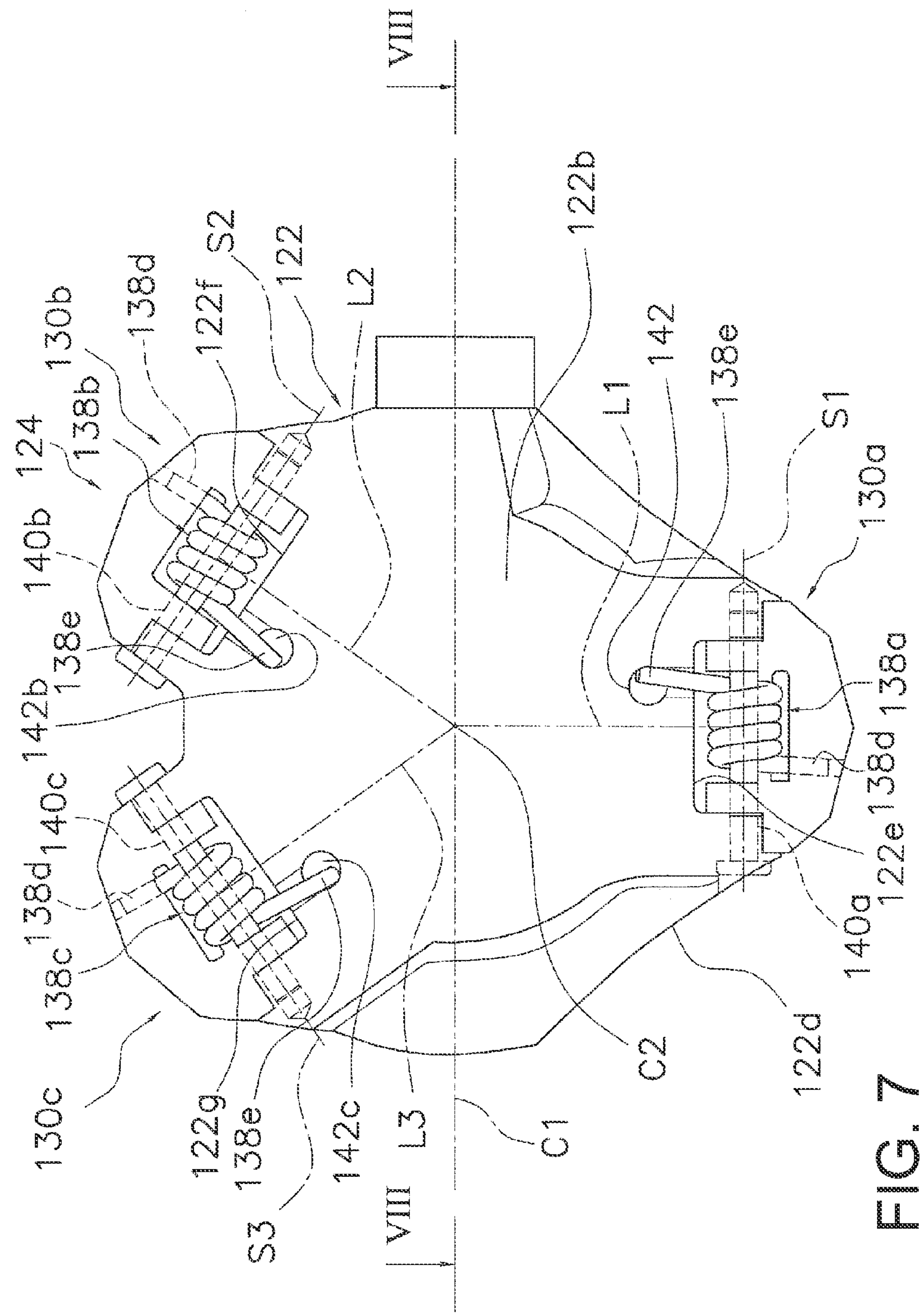
FIG. 7 is a bottom plan view of the bicycle pedal illustrated in FIG. 6 in accordance with the second embodiment.
Figure 8:
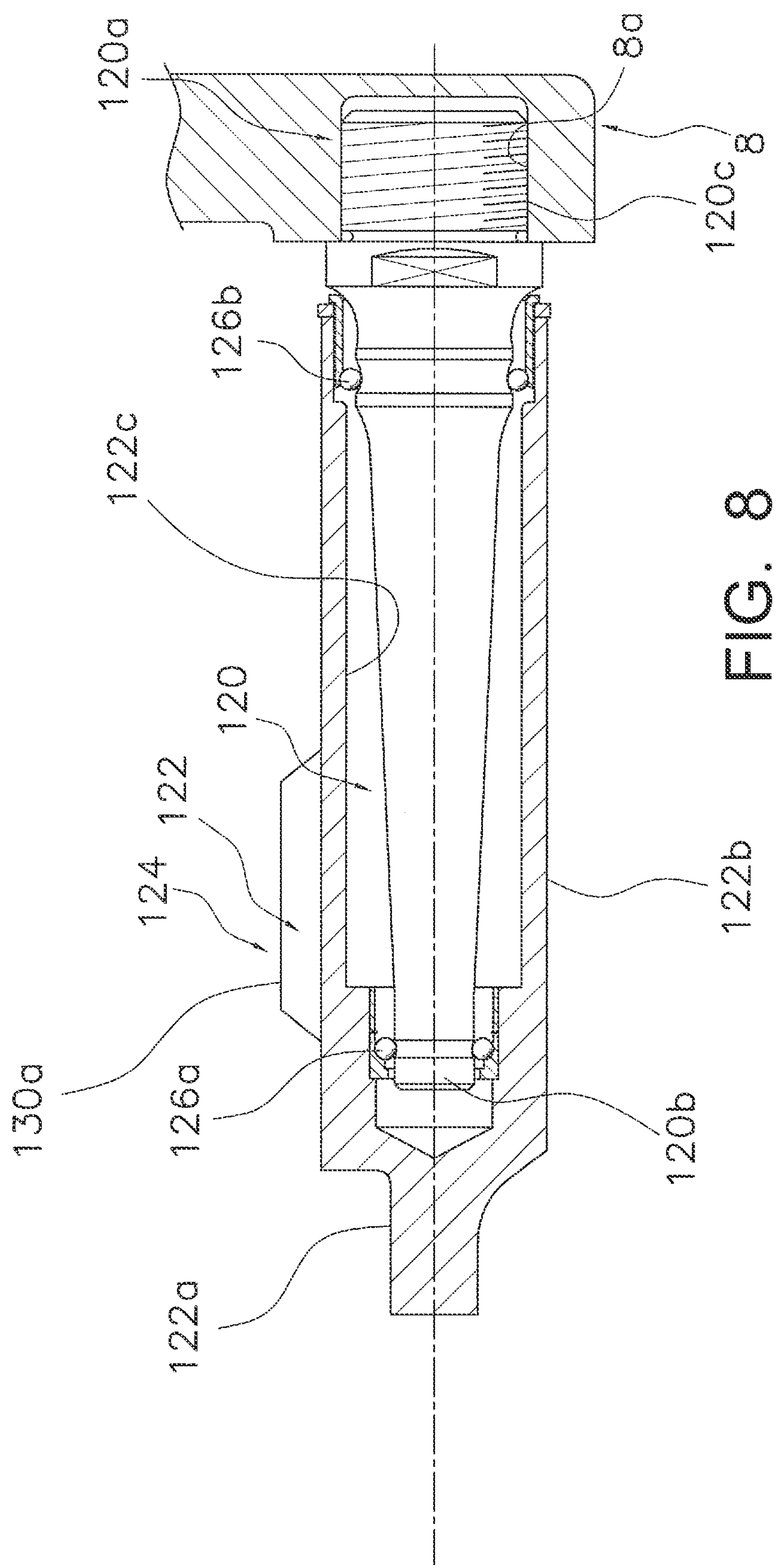
FIG. 8 is a cross-sectional view of the bicycle pedal illustrated in FIGS. 6 and 7 taken along the section line VIII-VIII of FIG. 7.

In FIGS. 6, 7 and 8, the pedal 110 according to the second embodiment of the present invention is detachably engaged with a cleat 150 that are attached to shoes. A bicycle pedal system 106 is configured by the pedal 110 and the cleat 150.

Pedal

The pedal 110 comprises a pedal shaft 120 (refer to FIG. 8) having a rotational center axis C1, a pedal main body 122 that is rotatably supported by the pedal shaft 120, and a clamp part 124 that is provided to the pedal main body 122 and that has three or more cleat clamping portions that retain the cleat 150.

As shown in FIG. 8, the pedal shaft 120 is housed in the shaft housing space 122*c* of the pedal main body 122, as mentioned below, in the same way as in the first embodiment. The pedal shaft 120 rotatably supports the pedal main body 122 around the rotational center axis C1 that passes through the center of the pedal shaft 20 and that extends in the longitudinal direction via a pair of rolling bearings 126*a* and 126*b*. The pedal shaft 120 comprises a first end portion 120*a* that is attached to the bicycle crank 8 and a second end portion 120*b* that is on the opposite side of the first end portion 120*a* in the rotational center axis C1 direction. A male threaded portion 20*c*, which is screwed into a screw hole 8*a* that is provided to the crank 8, is provided to the second end portion 120*b*. The pedal shaft 120 is an axis with a real body, i.e., a shaft member, and the rotational center axis C1 is a virtual axis line. Meanwhile, in FIGS. 6 and 7, a drawing of the pedal shaft 120 has been omitted.

As shown in FIG. 7, the pedal main body 122 is a plate-like member made of metal or synthetic resin and has a roughly heart shape when seen from the rear. The pedal main body 122 comprises a first surface 122*a* that faces the shoe, a second surface 122*b* that is on the opposite side of the first surface 122*a*, and a stepped cylindrical shaft housing space 122*c* (refer to FIGS. 6 and 8) in which the pedal shaft 20 is housed.

As shown in FIG. 6, the pedal main body 122 comprises a first protrusion 132, a second protrusion 134, and at least one inclined surface 136 (two in the illustrated embodiment. The first protrusion 132 protrudes from the first surface 122*a*. The first protrusion 132 is disposed in a position that straddles the rotational center axis C1 when seen from a direction that is perpendicular to the first surface 122*a*. The first protrusion 132 is disposed on the cleat rotational axis C2. The cleat rotational axis C2 is a central axis of the rotation operation when detaching the cleat 150 from the pedal 110, and this axis extends in a direction that is perpendicular to the first surface 122*a*. The first protrusion 132 comprises a pair of partially spherical or conical side surfaces 132*a*. In the second embodiment as well, the side surfaces 132*a* are partially conical. However, the side surfaces 132*a* can also have a partial spherical or a partial cylindrical surface shape.

The second protrusion 134 protrudes from the first surface 122*a* and extends in the rotational center axis C1 direction. The second protrusion 134 is disposed in a position that straddles the rotational center axis C1 when seen from a direction that is perpendicular to the first surface 122*a*. The protruding direction of the second protrusion 134, with respect to the first protrusion 132, is a direction that is parallel to the first surface 122*a*. Specifically, the second protrusion 134 protrudes on both sides of the rotational center axis C1 direction with respect to the first protrusion 132. In other words, the first protrusion 132 is provided to the center portion of the second protrusion 134 in the rotational center axis C1 direction. Additionally, the first protrusion 132 protrudes in a direction that is parallel to the first surface 122*a* with respect to the side surface 134*a* of the second protrusion 134.

At least one inclined surface 136 is inclined in a direction that gradually separates from the pedal shaft 120, from the second protrusion 134 toward the first surface 122*a*. The two ends of the inclined surface 136 are each connected to the top surface of the second protrusion 34 and the first surface 122*a*. In the second embodiment, the inclined surfaces 136 are provided on a side having the first end portion 20*a* of the pedal shaft 20, with respect to the first protrusion 132; that is, the inclined surfaces 136 are disposed on one side of the first protrusion 132 in the rotational center axis C1 direction. Additionally, the inclined surfaces 136 are inclined in a direction that gradually separates from the pedal shaft 120 from both sides of the direction that is perpendicular to the rotational center axis C1 of the second protrusion 134 toward the first surface 122*a*. Therefore, in the second embodiment, two inclined surfaces 136 are provided sandwiching the second protrusion 134.

As shown in FIGS. 6 and 7, the clamp part 124 comprises three cleat clamping portions, a first cleat clamping portion 130*a*, a second cleat clamping portion 130*b*, and a third cleat clamping portion 130*c* that is disposed separate from the second cleat clamping portion 130*b* in the rotational center axis C1 direction. Additionally, the clamp part 124 comprises a first biasing member 138*a* (refer to FIG. 7), a second biasing member 138*b*, and a third biasing member 138*c*. The first biasing member 138*a* biases the first cleat clamping portion 130*a* in a direction that retains the cleat 150. The second biasing member 138*b* biases the second cleat clamping portion 130*b* in a direction that retains the cleat 150. The third biasing member 138*c* biases the third cleat clamping portion 130*c* in a direction that retains the cleat 150.

As shown in FIG. 7, the first cleat clamping portion 130*a*, the second cleat clamping portion 130*b*, and the third cleat clamping portion 130*c* are disposed in the peripheral portion

122*d* of the pedal main body 122. Specifically, the second cleat clamping portion 130*b*, the third cleat clamping portion 130*c*, and the first cleat clamping portion 130*a* are separately disposed in a second mounting recess 122*f* and a third mounting recess 122*g* that are disposed on both sides of a heart-shaped recess of the pedal main body 122, as well as in a first mounting recess 122*e* that is disposed in the distal end portion that faces the heart-shaped recess, respectively. The first mounting recess 122*e* to the third mounting recess 122*g* are formed to be recessed inwards in a roughly rectangular shape extending through the first surface 122*a* and the second surface 122*b*.

The first cleat clamping portion 130*a* and the second cleat clamping portion 130*b* are disposed sandwiching the pedal shaft 120 so that the pedal shaft 120 extends between them. The third cleat clamping portion 130*c* is disposed on a side having the second cleat clamping portion 130*b* with respect to the pedal shaft 120. In the second embodiment, the third cleat clamping portion 130*c* is disposed on a side having the second end portion 120*b* of the pedal shaft 120 of the second cleat clamping portion 130*b*. Therefore, the first cleat clamping portion 130*a*, the second cleat clamping portion 130*b* and the third cleat clamping portion 130*c* are disposed at an interval in a direction that is perpendicular to the rotational center axis C1 direction (the longitudinal direction). Meanwhile, the third cleat clamping portion 130*c* can be disposed on a side having the second end portion 120*b*, and the second cleat clamping portion 130*b* can be disposed on a side having the first end portion 120*a*.

As shown in FIG. 7, the first cleat clamping portion 130*a* is rotatably provided around a first axis S1 by a first shaft member 140*a* that is disposed to the pedal main body 122 along the first axis S1 direction. The first axis S1 extends in a direction that is parallel to the first surface 122*a*, as well as in a direction that intersects with a first straight line L1, which extends in the radial direction from the cleat rotational axis C2 toward the first cleat clamping portion 130*a*. Preferably, the first axis S1 extends in a direction that is essentially parallel to the rotational center axis C1 and that is essentially perpendicular with respect to the first straight line L1.

The second cleat clamping portion 130*b* is rotatably provided around a second axis S2 by a second shaft member 140*b* that is disposed to the pedal main body 122 along the second axis S2 direction. The second axis S2 extends in a direction that is parallel to the first surface 122*a*, as well as in a direction that intersects with a second straight line L2, which extends in the radial direction from the cleat rotational axis C2 toward the second cleat clamping portion 130*b*. Preferably, the second axis S2 extends in a direction that is essentially perpendicular to the second straight line L2.

The third cleat clamping portion 130*c* is rotatably provided around a third axis S3 by a third shaft member 140*c* that is disposed to the pedal main body 122 along the third axis S3 direction. The third axis S3 extends in a direction that is parallel to the first surface 122*a*, as well as in a direction that intersects with a third straight line L3, which extends in the radial direction from the cleat rotational axis C2 toward the third cleat clamping portion 130*c*. In the second embodiment, the third straight line L3 is disposed in a position that is in line symmetrically with the second straight line L2, with respect to the rotational center axis C1 that passes through the cleat rotational axis C2. Preferably, the third axis S3 extends in a direction that is essentially perpendicular to the third straight line L3. Here, the first shaft member 140*a*, the second shaft member 140*b*, and the third shaft member 140*c* are axes with a real body (the shaft member) in the same way as the pedal shaft 120, and they are fixed to the pedal main body 122 by a male threaded portion that is formed in the distal end. The first axis S1, the second axis S2, and the third axis S3 are virtual axis lines in the same way as the rotational center axis C1.

As shown in FIGS. 6 and 7, the first cleat clamping portion 130*a*, the second cleat clamping portion 130*b*, and the third cleat clamping portion 130*c* all comprise a main body portion 130*d* and a retaining portion 130*e* that retains the cleat 150. The main body portion 130*d* is rotatably supported by the pedal main body 122. The retaining portion 130*e* protrudes from the main body portion 130*d* toward the first protrusion 132 and is disposed with an interval that is able to retain the cleat 150 between the first surface 122*a*. All of the retaining portions 130*e* of the first cleat clamping portion 130*a*, the second cleat clamping portion 130*b*, and the third cleat clamping portion 130*c* are biased in a direction toward the center (the first protrusion 32) of the pedal main body 122 by the first biasing member 138*a*, the second biasing member 138*b*, and the third biasing member 138*c*, respectively. A guide surface 130*f* that inclines toward the first surface 122*a* is formed in the retaining portion 130*e*. The guide surface 130*f* is provided to pivot the retaining portion 130*e* in the opening direction against the biasing force of one of the first biasing member 138*a* to the third biasing member 138*c* when one of the first cleat clamping portion 130*a* to the third cleat clamping portion 130*c* has been pressed with the cleat 150.

As shown in FIG. 7, the first biasing member 138*a* is, for example, a torsion coil spring made of a metal spring wire with a circular cross section. In the first biasing member 138*a*, the first end portion 138*d* is locked to the first cleat clamping portion 130*a*, and the second end portion 138*e* is in contact with the distal end of a first screw member 142*a* for adjusting the spring force (the biasing force). The second end portion 138*e* of the first biasing member 138*a* is disposed in a groove that is formed on the second surface 122*b* toward the distal end of the first screw member 142*a*. The first screw member 142*a* is, for example, a hexagon socket set screw that is screwed into a screw hole that is disposed extending through the pedal main body 122. The distal end position of the first screw member 142*a* on a side having the second surface 122*b* can be adjusted by turning the first screw member 142*a* with a tool, such as a hexagonal wrench, from a side having the first surface 122*a*. The spring force (the biasing force) of the first biasing member 138*a* becomes stronger as the distal end position of the first screw member 142*a* approaches the second surface 122*b*.

The second biasing member 138*b* is a spring member made of metal wire with the same structure as the first biasing member 38*a*. In the second biasing member 138*b*, the first end portion 138*d* is locked to the second cleat clamping portion 130*b*, and the second end portion 138*e* is in contact with a second screw member 142*b* for adjusting the spring force (the biasing force). The second screw member 142*b* is a hexagon socket set screw like the first screw member 142*a*, and the distal end position on a side having the second surface 122*b* can be adjusted by using of a turning tool, such as a hexagonal wrench, from a side having the first surface 122*a*. The spring force (the biasing force) of the second biasing member 138*b* becomes stronger as the distal end position of the second screw member 142*b* approaches the second surface 122*b*.

The third biasing member 38*c*, unlike in the first embodiment, is a spring member made of metal wire with the same structure as the first biasing member 138*a* and the second biasing member 138*b*. In the third biasing member 138*c*, the first end portion 138*d* is locked to the third cleat clamping portion 130*c*, and the second end portion 138*e* is in contact with a third screw member 142*c* for adjusting the spring force (the biasing force). The third screw member 142*c* is a hexagon socket set screw like the first screw member 142*a*, and the distal end position of the third screw member 142*c* on a side having the second surface 122*b* can be adjusted by using a turning tool, such as a hexagonal wrench, from a side having the first surface 122*a*. The spring force (the biasing force) of the third biasing member 138*c* becomes stronger as the distal end position of the third screw member 142*c* approaches the second surface 122*b*.

Cleat

Figure 9:
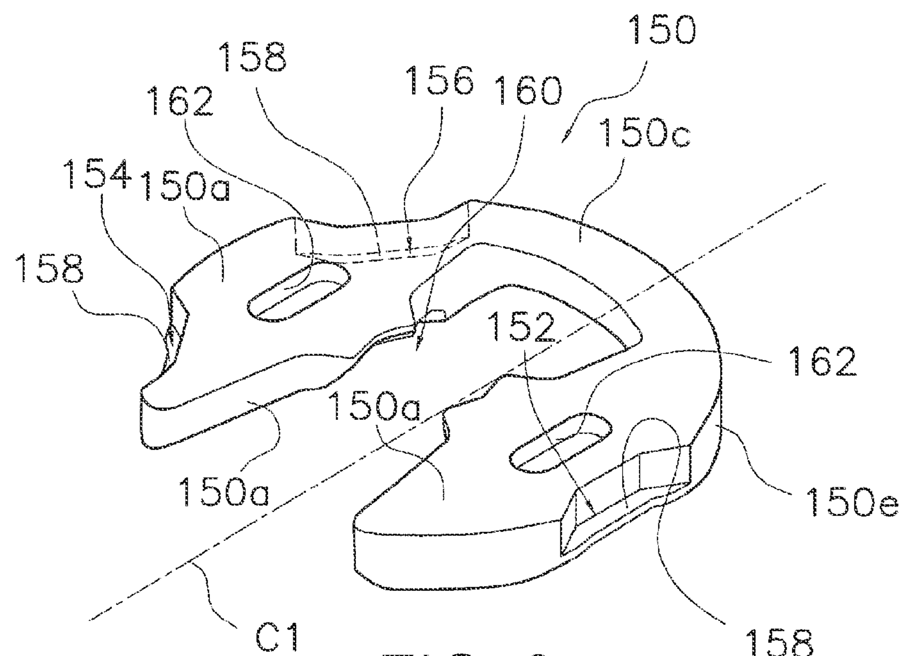
FIG. 9 is a top perspective view of a cleat that engages the pedal in accordance with the second embodiment.
Figure 10:
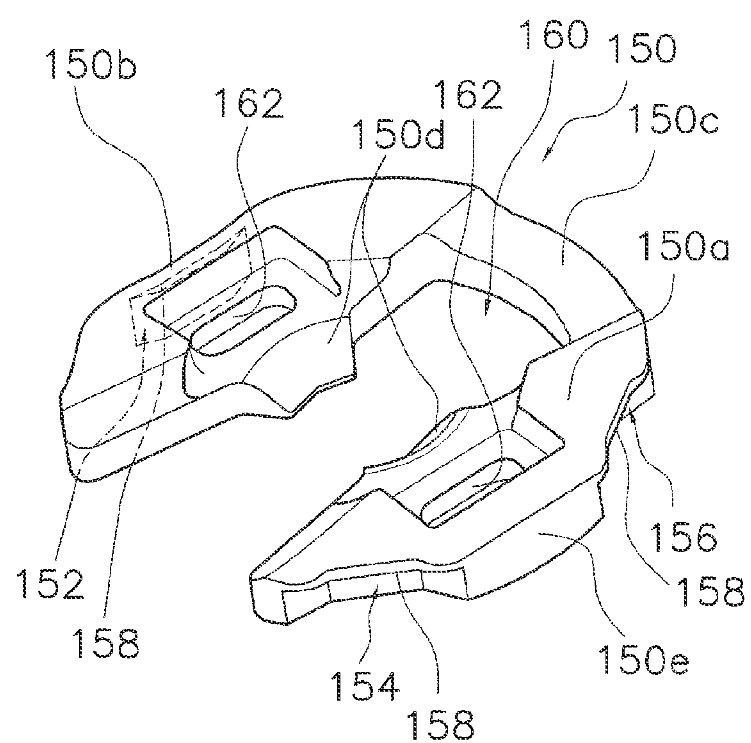
FIG. 10 is a bottom plan view of the cleat illustrated in FIG. 9.

As shown in FIGS. 9 and 10, the cleat 150 comprises a first attaching portion 150*a*, a second attaching portion 150*b*, a connecting portion 150*c* and a pair of abutting surfaces 150*d*. The first attaching portion 150*a*, the second attaching portion 150*b* and the connecting portion 150*c* are attached to the first surface 122*a* of the pedal 110. The cleat 150 detachably engages a clamp part 124 that is attached to the pedal main body 122 of the pedal 110. The cleat 150 comprises a first engagement portion 152, a second engagement portion 154, and a third engagement portion 156, which detachably engages the clamp part 124.

The second attaching portion 150*b* is attached to the first surface 122*a* on the opposite side of the first attaching portion 150*a* with respect to the pedal shaft 120 of the pedal 110. The connecting portion 150*c* connects the first attaching portion 150*a* and the second attaching portion 150*b* to form a gap 160, in which a part of the pedal main body 122 is disposed between the first attaching portion 150*a* and the second attaching portion 150*b*. In the second embodiment, the connecting portion 150*c* is provided so that the first protrusion 132 and the second protrusion 134 as a part of the pedal main body 122 can be disposed in the gap 160.

In the second embodiment, the second engagement portion 154 and the third engagement portion 156 are provided in the first attaching portion 150*a*, and they detachably engage the clamp part 124. The first engagement portion 152 detachably engages the clamp part 124 in a position that is on the opposite side of the second engagement portion 154, with respect to the pedal shaft 120 of the bicycle pedal 110. Therefore, the first engagement portion 152 is provided in the second attaching portion 150*b*. The third engagement portion 156 detachably engages the clamp part 124 in a position that is offset from the second engagement portion 54 along the rotational center axis C1 direction of the pedal shaft 20. In the second embodiment, the third engagement portion 56 detachably engages the clamp part 124 in a position that is offset from the second engagement portion 154 along the rotational center axis C1 direction of the pedal shaft 120. Therefore, the third engagement portion 56 is provided in the first attaching portion 150*a*. Specifically, the first engagement portion 152 engages the first cleat clamping portion 130*a* of the clamp part 124. The second engagement portion 154 engages the second cleat clamping portion 130*b* of the clamp part 124. The third engagement portion 156 engages the third cleat clamping portion 130*c* of the clamp part 124. The first engagement portion 152, the second engagement portion 154, and the third engagement portion 156 are provided in the peripheral portion 150*e* of the cleat 150. The first engagement portion 152, the second engagement portion 154, and the third engagement portion 156 each comprises an attaching recess 158 that is formed to be recessed from the peripheral portion 150*e* of the cleat 150. The attaching recess 158 is formed to be recessed in a flat isosceles trapezoid shape in a plan view. The thickness of the first engagement portion 152, the second engagement portion 154, and the third engagement portion 156 on a side having the peripheral portion 150*e* of the cleat 150 is slightly smaller than the gap between the retaining portion 130*e* of the clamp part 124 and the first surface 122*a*.

A pair of abutting surfaces 150*d* (refer to FIG. 10) are provided so that they abut a part of the pedal main body 122. The cleat 150 comprises a pair of long holes 162, which are used for attaching the cleat 150 to the shoe with a bolt member (not diagrammed). The pair of abutting surfaces 150*d* has a spherical, conical, or cylindrical shape. In the first embodiment, the pair of abutting surfaces 150*d* has a partially conical shape and abuts the side surfaces 132*a* of the first protrusion 132 as a part of the pedal main body 122. The abutting surfaces 150*d* each comprises a side surface shape that corresponds to one of the side surfaces 132*a* of the first protrusion 132. The distal end portion of the abutting surfaces 150*d* that are disposed opposing each other is formed in a flat V-shape. Meanwhile, in the case that the first protrusion has a conical shape or a spherical shape, the abutting surfaces can have partial cylindrical shapes.

Attaching and Detaching Operation of the Cleat

In a bicycle pedal system 106 configured in this way, when attaching a shoe to the pedal 110, the shoe is disposed on the first surface 122*a* of the pedal main body 122 of the pedal 110, in a state in which the cleat 150 is attached to the shoes by a bolt member that is not diagrammed. Then, the second engagement portion 154 and the third engagement portion 156 are engaged with the second cleat clamping portion 130*b* and the third cleat clamping portion 130*c*. In this state, if the rear portion of the shoes strongly steps onto the pedal 110, the retaining portion 130*e* will open due to the action of the guide surface 130*f* of the retaining portion 130*e* of the first cleat clamping portion 130*a*, and the first engagement portion 152 of the cleat 150 will be clamped by the first cleat clamping portion 130*a*. In a state in which the cleat 150 is retained by the clamp part 124, the pair of abutting surfaces 150*d* will be in contact with and will be disposed to the side surfaces 132*a* of the first protrusion 132. At this time, the cleat 150 will engage the pedal 110 at three positions. The gap between the first cleat clamping portion 130*a* and the third cleat clamping portion 130*c*, as well as the gap between the first cleat clamping portion 130*a* and the second cleat clamping portion 130*b*, can be made larger than the width of a conventional lever member that engages the pedal at one position in the rear. For this reason, the cleat 150 can be retained to the pedal 110 more stably than with the prior art. Additionally, the shoe to which the cleat 150 is attached becomes less likely to be tilted, and the pedaling force of the rider can be efficiently transmitted to the pedal 110. With this, the pedal can be operated more stably and efficiently. Meanwhile, as the attaching and detaching operation of the cleat 150, first engaging the first engagement portion 152 to the first cleat clamping portion 130*a* and then engaging the second engagement portion 154 and the third engagement portion 156 simultaneously into the second cleat clamping portion 130*b* and the third cleat clamping portion 130*c* by stepping onto the inner side of the pedal 110 is possible.

When detaching the shoe from the pedal 110, the heel side of the shoe is slightly twisted outside. Then, since the abutting surfaces 150*d* abut the side surfaces 132*a* of the first protrusion 132, the shoe rotates about the cleat rotational axis C2. At this time, the abutting surfaces 150*d* slide along the side surfaces 132*a*. When the shoe rotates, the corner of the opposing surface of the first attaching portion 150*a* and the second attaching portion 150*b* of the cleat 150 will ride on the inclined surface 136. With this, the cleat 150 separates from the first surface 122*a* of the pedal 110, and the third cleat clamping portion 130*c* will be pushed up from the first cleat clamping portion 130*a* and will be opened. As a result, the cleat 150 will detach from the pedal 110, and the shoe can be detached from the pedal 110. By making the side surface shapes of the abutting surfaces 150*d* and the side surfaces 132*a* partially spherical or partially conical, when the cleat 150 starts to separate from the first surface 122*a*, the cleat 150 can be moved in a direction that intersects with the cleat rotational axis C2 along the side surfaces 132*a*, and the cleat 150 can be easily detached from the pedal 110.

Third Embodiment

Figure 11:
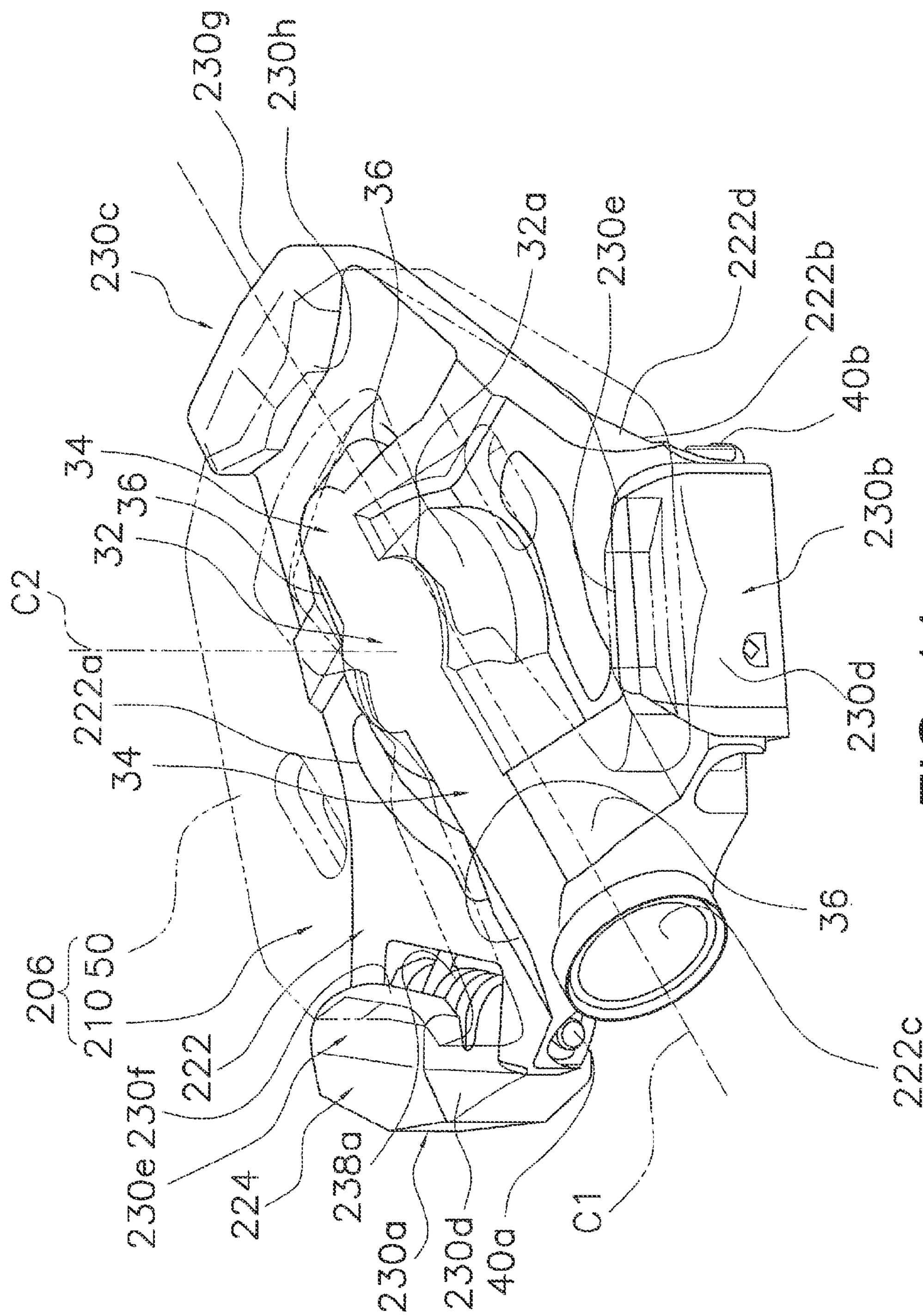
FIG. 11 is a top perspective view of a bicycle pedal in accordance with in accordance with a third embodiment.
Figure 12:
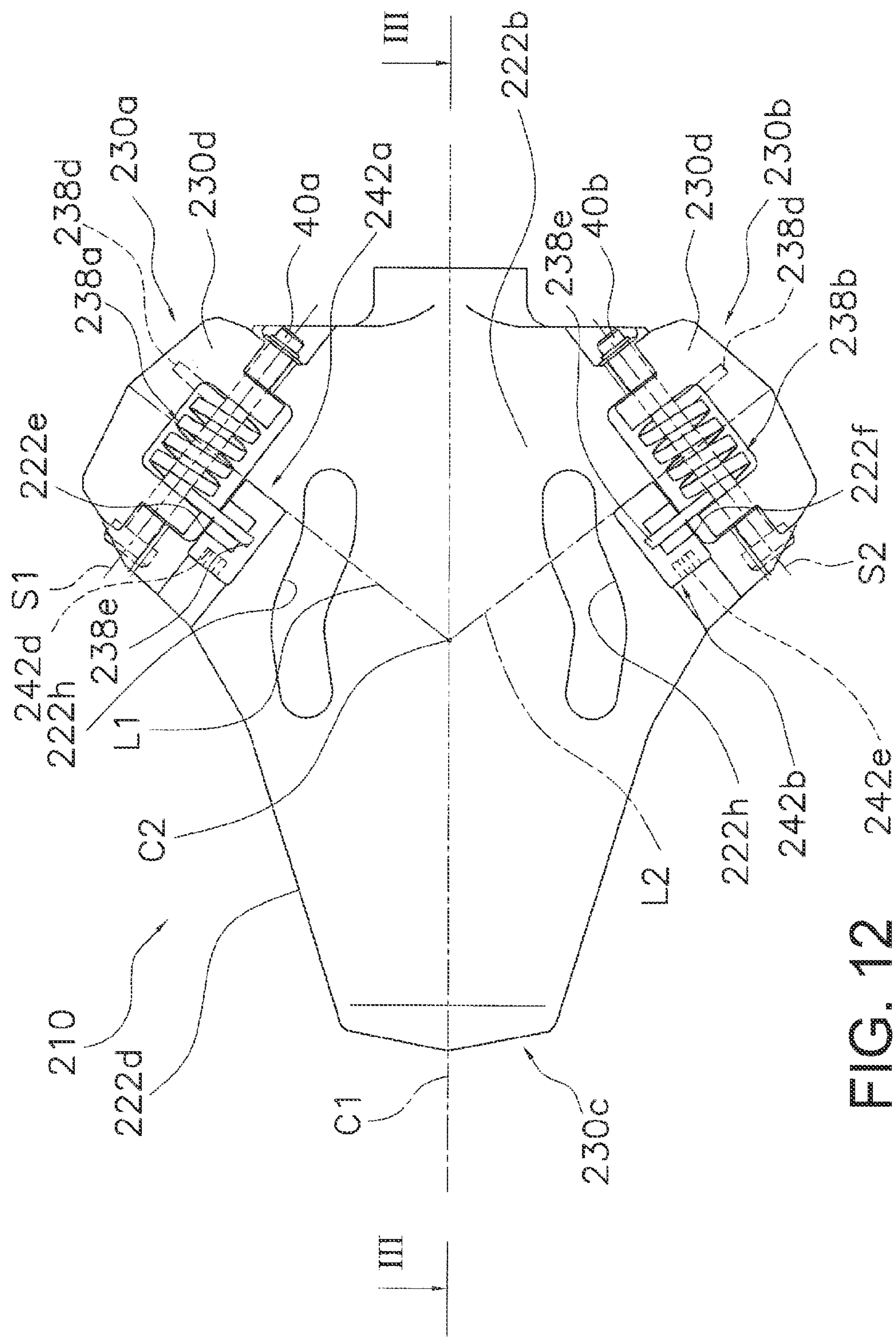
FIG. 12 is a bottom plan view of the bicycle pedal illustrated in FIG. 11 in accordance with the third embodiment.

In FIGS. 11 and 12, the pedal 210 according to the third embodiment of the present invention is detachably engaged with the cleat 50, with the same configuration as in the first embodiment, that are attached to shoes. In the third embodiment, a bicycle pedal system 206 is configured by the pedal 210 and the cleat 50. In the pedal 210 of the third embodiment, the shape of the pedal main body 222 and the configuration of the clamp part 224 differ from those in the first embodiment. Therefore, in the following explanation, the pedal main body 222 and the clamp part 224 will be mainly explained; regarding the cleat 50 and the pedal shaft 20, which have the same configuration, the same reference symbols as those in the first embodiment will be used in FIGS. 11 and 12, and their explanations have been omitted.

As shown in FIG. 12, the pedal main body 222 is a plate-like member made of metal or synthetic resin that is formed so that two sides of a roughly isosceles triangular shape, when seen from the rear, are curved and recessed on a side having the rotational center axis C1. The pedal main body 222 comprises a first surface 222*a* that faces the shoe, a second surface 222*b* that is on the opposite side of the first surface 222*a*, and a stepped cylindrical shaft housing space 222*c* (refer to FIG. 11) in which the pedal shaft 20 is housed. Additionally, in order to achieve a reduction in the weight, the pedal main body 222 comprises a pair of slits 222*h* that extends through the first surface 222*a* and the second surface 222*b* and that is formed curving in an S-shape. The pair of slits 222*h* is disposed on both sides of the first protrusion 32.

As shown in FIG. 11, the pedal main body 222 comprises a first protrusion 32, a second protrusion 34, and at least one inclined surface 36 (two inclined surfaces in this embodiment) in the same way as in the first embodiment. Regarding the first protrusion 32, the second protrusion 34, and the inclined surface 36, the same reference symbols as those in the first embodiment have been used in FIG. 11, and their explanations have been omitted.

As shown in FIGS. 11 and 12, the clamp part 224 comprises three cleat clamping portions, a first cleat clamping portion 230*a*, a second cleat clamping portion 230*b*, and a third cleat clamping portion 230*c*. The third cleat clamping portion 230*c* is offset from the second cleat clamping portion 230*b* along the rotational center axis C1 direction. In the third embodiment, the third cleat clamping portion 230*c* is integrally formed with the pedal main body 222 and does not rotate with respect to the pedal main body 222. With this, the rigidity of the third cleat clamping portion 230*c* that is disposed on the outside of the bicycle can be increased, so that the third cleat clamping portion 230*c* is less likely to be damaged when falling. Additionally, the clamp part 224 comprises a first biasing member 238*a* and a second biasing member 238*b* (refer to FIG. 12). The first biasing member 238*a* biases the first cleat clamping portion 230*a* in a direction that retains the cleat 50. The second biasing member 238*b* biases the second cleat clamping portion 230*b* in a direction that retains the cleat 50.

As shown in FIG. 12, the first cleat clamping portion 230*a*, the second cleat clamping portion 230*b*, and the third cleat clamping portion 230*c* are disposed in the peripheral portion 222*d* of the pedal main body 222. Specifically, the first cleat clamping portion 230*a* and the second cleat clamping portion 230*b* are separately disposed in a first mounting recess 222*e* and a second mounting recess 222*f* that are disposed in three corners of the pedal main body 222. The first mounting recess 222*e* and the second mounting recess 222*f* are formed to be recessed inwards in a roughly rectangular shape extending through the first surface 222*a* and the second surface 222*b*.

The first cleat clamping portion 230*a* and the second cleat clamping portion 230*b* are disposed sandwiching the pedal shaft 20 so that the pedal shaft 20 extends between them in the same way as in the first embodiment. Specifically, the first cleat clamping portion 230*a* and the second cleat clamping portion 230*b* are disposed so that they are in line symmetrically with respect to the rotational center axis C1. The third cleat clamping portion 230*c* is disposed between the first cleat clamping portion 230*a* and the second cleat clamping portion 230*b* when seen from the rotational center axis C1 direction. Also in the third embodiment, the third cleat clamping portion 230*c* is disposed in the intermediate position of the first cleat clamping portion 230*a* and the second cleat clamping portion 230*b* when seen from the rotational center axis C1 direction. That is, the third cleat clamping portion 230*c* is disposed on the rotational center axis C1. Additionally, the third cleat clamping portion 230*c* is disposed further on a side having the second end portion 20*b* than the first cleat clamping portion 230*a* or the second cleat clamping portion 230*b*. Therefore, the third cleat clamping portion 230*c*, the first cleat clamping portion 230*a* and the second cleat clamping portion 230*b* are disposed at an interval in the rotational center axis C1 direction (the lateral direction). Meanwhile, the first cleat clamping portion 230*a* and the second cleat clamping portion 230*b* can be disposed on a side having the second end portion 20*b*, and the third cleat clamping portion 230*c* can be disposed on a side having the first end portion 20*a*.

As shown in FIG. 12, the first cleat clamping portion 230*a* is rotatably provided around a first axis S1 by a first shaft member 40*a* that is disposed to the pedal main body 222 in the first mounting recess 222*e* along the first axis S1 direction. The first axis S1 extends in a direction that is parallel to the first surface 222*a*, as well as in a direction that intersects with a first straight line L1, which extends in the radial direction from the cleat rotational axis C2 toward the first cleat clamping portion 230*a*. Preferably, the first axis S1 extends in a direction that is essentially perpendicular to the first straight line L1.

The second cleat clamping portion 230*b* is rotatably provided around a second axis S2 by a second shaft member 40*b* that is disposed to the pedal main body 222 in the second mounting recess 222*f* along the second axis S2 direction. The second axis S2 extends in a direction that is parallel to the first surface 222*a*, as well as in a direction that intersects with a second straight line L2, which extends in the radial direction from the cleat rotational axis C2 toward the second cleat clamping portion 230*b*. Preferably, the second axis S2 extends in a direction that is essentially perpendicular to the second straight line L2. The second straight line L2 is disposed in a line symmetrically with the first straight line L1 with respect to the rotational center axis C1.

As shown in FIGS. 11 and 12, the first cleat clamping portion 230*a* and the second cleat clamping portion 230*b* each comprise a main body portion 230*d* and a retaining portion 230*e* that retains the cleat 50. The main body portion 230*d* is rotatably supported by the pedal main body 222. The retaining portion 230*e* protrudes from the main body portion 230*d* toward the first protrusion 32 and is disposed with an interval that is able to retain the cleat 50 between the first surface 222*a*. Each of the retaining portions 230*e* of the first cleat clamping portion 230*a* and the second cleat clamping portion 230*b* is biased in a direction toward the center (the first protrusion 32) of the pedal main body 222 by the first biasing member 238*a* and the second biasing member 238*b*, respectively. A guide surface 230*f* that inclines toward the first surface 222*a* is formed in the retaining portion 230*e*. The guide surface 230*f* is provided to pivot the retaining portion 230*e* in the opening direction (counterclockwise in FIG. 12) against the biasing force of the first biasing member 238*a* and the second biasing member 238*b* when the first cleat clamping portion 230*a* and the second cleat clamping portion 230*b* are pressed with the cleat 50.

As shown in FIG. 12, the first biasing member 238*a* is, for example, a torsion coil spring made of metal spring wire with a rectangular cross section. In the third embodiment, the first biasing member 238*a* and the second biasing member 238*b* are configured in the same way as the third biasing member 38*c* in the first embodiment. The first end portion 238*d* of the first biasing member 238*a* is locked to the first cleat clamping portion 230*a*, and the second end portion 238*e* is locked by an adjustment member 242*a* for adjusting the spring force. In the same way, the first end portion 238*f* of the second biasing member 238*b* is locked to the second cleat clamping portion 230*b*, and the second end portion 238*g* is locked by an adjustment member 242*b* for adjusting the spring force.

The adjustment member 242*a* and the adjustment member 242*b* are, for example, cylindrical members. The adjustment member 242*a* is rotatably mounted to the second surface 222*b* about an axis that is parallel to the first axis S1. The adjustment member 242*b* is rotatably mounted to the second surface 222*b* about an axis that is parallel to the second axis S2. Formed on the outer peripheral surface of the adjustment member 242*a* and the adjustment member 242*b* are planar portions that cut away a part of the cylindrical surface at, for example, three locations in the circumferential direction. Each of the planar portions is formed so that the distance to the center of the adjustment member 242*a* (or the adjustment member 242*b*) is different from each other. The second end portion 238*e* of the first biasing member 238*a* (or the second end portion 242*g* of the adjustment member 242*b*) is selectively locked to the above-described plurality of planar portions. The adjustment member 242*a* and the adjustment member 242*b* comprise a tool locking hole 242*d* to which tools such as a hexagonal wrench can be mounted. The planar portion that locks the second end portion 238*e* of the first biasing member 238*a* (or the second end portion 238*g* of the second biasing member 238*b*) is changed by turning the adjustment member 242*a* (or the adjustment member 242*b*) by mounting a tool to this tool locking hole 242*d* and changing the spring force (the biasing force).

As mentioned above, the third cleat clamping portion 230*c* is integrally formed with the pedal main body 222. The third cleat clamping portion 230*c* comprises a main body portion 230*g* that is integrally formed with the pedal main body 222, as well as a retaining portion 230*h* that is integrally formed with the main body portion 230*g* and that retains the cleat 50. The retaining portion 230*h* protrudes from the main body portion 230*g* toward the first protrusion 32 and is disposed with an interval that is able to retain the cleat 50 between the first surface 222*a*.

Attaching and Detaching Operation of the Cleat

In a bicycle pedal system 206 configured in this way, when attaching a shoe to the pedal 210, the shoe is disposed on the first surface 222*a* of the pedal main body 222 of the pedal 210 in a state in which the cleat 50 is attached to the shoe by a bolt member that is not diagrammed. Then, the third engagement portion 56 is engaged with the third cleat clamping portion 230*c* on the outside of the shoe (a side having the second end portion 20*b* of the pedal shaft 20). In this state, if the inside of the shoe (a side having the first end portion 20*a* of the pedal shaft 20) strongly steps onto the pedal 210, the retaining portions 230*e* will open due to the action of the guide surface 230*f* of each of the retaining portions 230*e* of the first cleat clamping portion 230*a* and the second cleat clamping portion 230*b*; then, the first engagement portion 52 and the second engagement portion 54 of the cleat 50 will be separately clamped by the first cleat clamping portion 230*a* and the second cleat clamping portion 230*b*. In a state in which the cleat 50 is retained by the clamp part 224, the pair of abutting surfaces 50*d* will be in contact with and will be disposed to the side surfaces 32*a* of the first protrusion 32. At this time, the cleat 50 will engage the pedal 210 at three positions, and the gap between the first cleat clamping portion 230*a* and the third cleat clamping portion 230*c*, as well as the gap between the second cleat clamping portion 230*b* and the third cleat clamping portion 230*c*, can be made to be larger than the width of a conventional lever member that engages the pedal at one position in the rear. For this reason, the cleat 50 can also be retained to the pedal 210 more stably in the third embodiment than with the prior art. Additionally, the shoes to which the cleat 50 is attached become less likely to be tilted, and the pedaling force of the rider can be efficiently transmitted to the pedal 210. With this, the pedal 210 can be operated more stably and efficiently.

When detaching the shoe from the pedal 210, the heel side of the shoe is slightly twisted outside. Then, since the abutting surfaces 50*d* abuts the side surfaces 32*a* of the first protrusion 32, the shoe rotates about the cleat rotational axis C2. At this time, the abutting surfaces 50*d* slides along the side surfaces 32*a*. When the shoe rotates, the corner of the opposing surface of the first attaching portion 50*a* and the second attaching portion 50*b* of the cleat 50 will ride on the inclined surface 36. With this, the cleat 50 is separated from the first surface 222*a* of the pedal 210, and the first cleat clamping portion 230*a* and the second cleat clamping portion 230*b* will be pushed up and will be opened. As a result, the cleat 50 will be detached from the pedal 210, and the shoe can be detached from the pedal 210. By making the side surface shape of the abutting surfaces 50*d* and the side surfaces 32*a* spherical or conical, when the cleat 50 start to separate from the first surface 222*a*, the cleat 50 can be moved in a direction that intersects with the cleat rotational axis C2 along the side surfaces 32*a*, and the cleat 50 can be easily detached from the pedal 210.

Modified Example of the Third Embodiment

Figure 13:
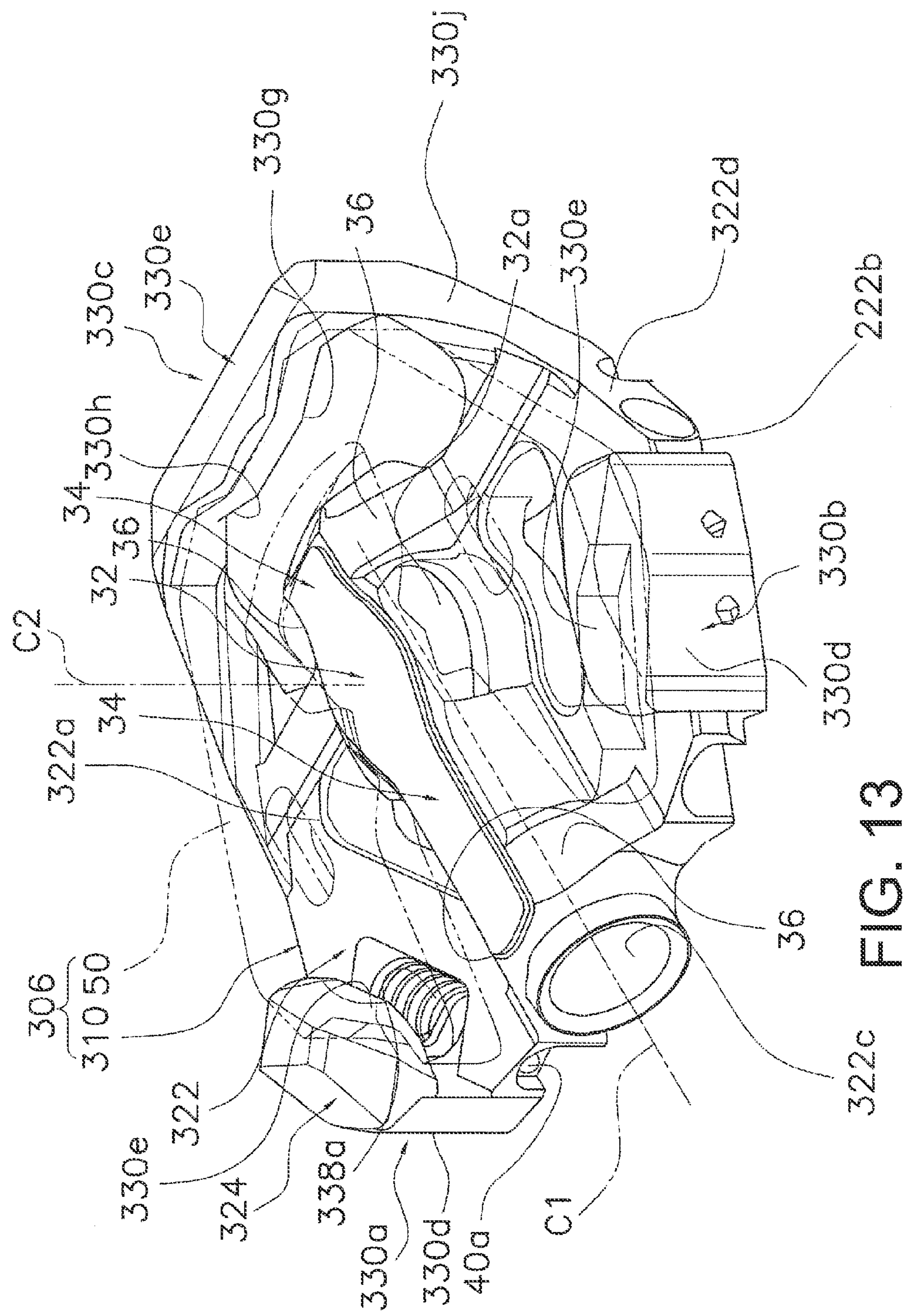
FIG. 13 is a top perspective view of a bicycle pedal in accordance with a first modification of the third embodiment.

In FIG. 13, a pedal 310 according to a modified example of the third embodiment of the present invention (hereinafter simply referred to as the modified example) is detachably engaged with the cleat 50 that has the same configuration as those in the first embodiment that is attached to a shoe. In the modified example, a bicycle pedal system 306 is configured by a pedal 310 and cleat 50. In the pedal 310 of the modified example, the shape of the pedal main body 322 and the configuration of the third cleat clamping portion 330*c* differ from those in the first embodiment. Therefore, in the following explanation, the pedal main body 322 and the clamp part 324 will be mainly explained; regarding the cleat 50 and the pedal shaft 20, which have the same configuration, the same reference symbols as those used in the first embodiment and the third embodiment will be used in FIGS. 13 to 17, and their explanations have been omitted.

Figure 14:
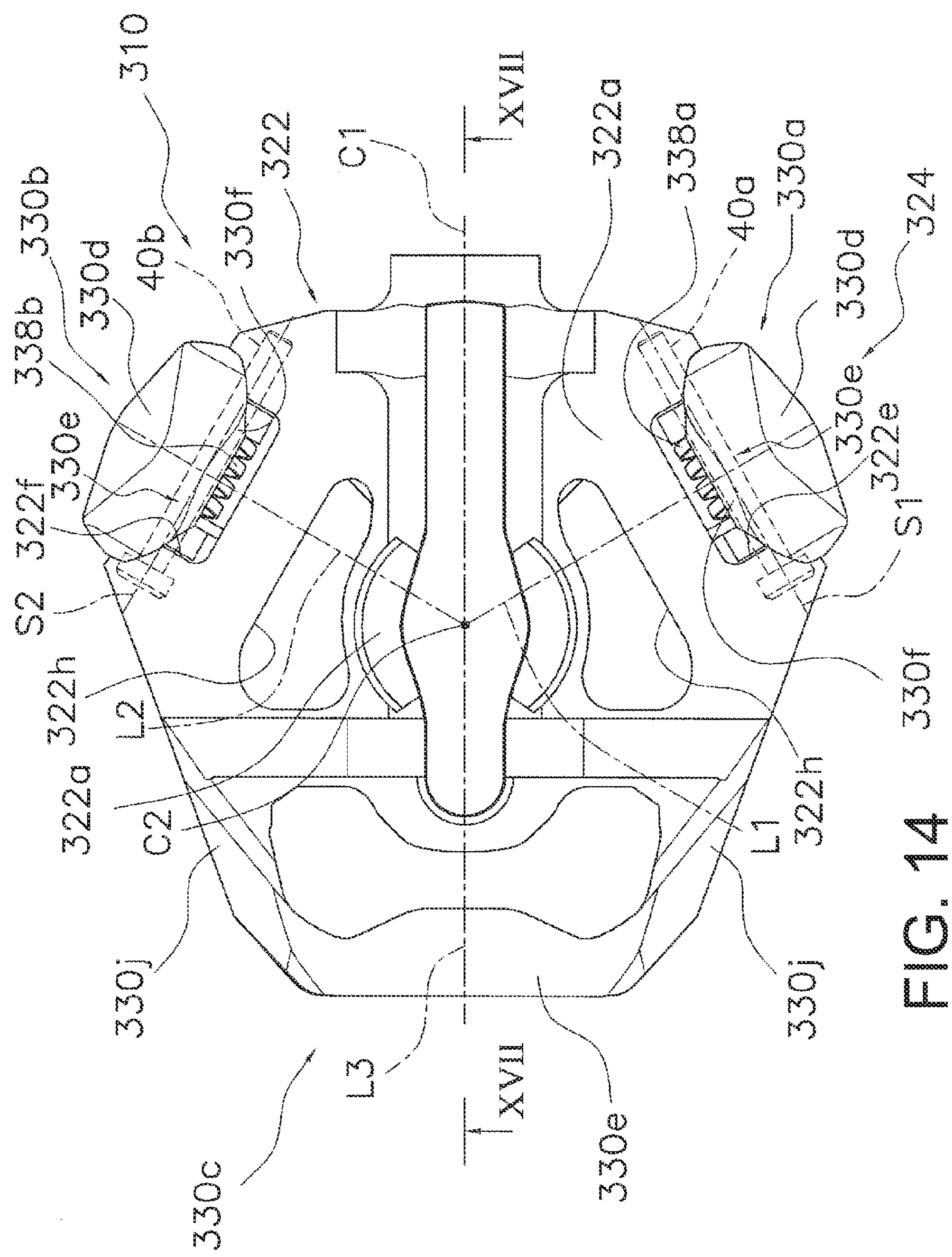
FIG. 14 is a top plan view of the bicycle pedal illustrated in FIG. 13 in accordance with the first modification of the third embodiment.

As shown in FIGS. 13 and 14, the pedal main body 322 is a plate-like member made of metal or synthetic resin, and this pedal main body has a roughly isosceles triangular shape in a plan view. As shown in FIGS. 13 to 16, the pedal main body 322 comprises a first surface 322*a* that faces the shoe, a second surface 322*b* that is on the opposite side of the first surface 322*a*, and a stepped cylindrical shaft housing space 322*c* (refer to FIG. 17) in which the pedal shaft 20 is housed. Additionally, in order to achieve a reduction in the weight, the pedal main body 322 comprises two slits 322*h* that extend through the first surface 322*a* and the second surface 322*b*. The slits 322*h* are disposed on both sides of the first protrusion 32.

As shown in FIG. 13, the pedal main body 322 comprises a first protrusion 32, a second protrusion 34, and at least one inclined surface 36 (two inclined surfaces in this embodiment) in the same way as the first embodiment. Regarding the first protrusion 32, the second protrusion 34, and the inclined surfaces 36, the same reference symbols as those used in the first embodiment have been used in FIG. 13, and their explanations have been omitted.

As shown in FIGS. 13 and 14, the clamp part 324 comprises three cleat clamping portions, a first cleat clamping portion 330*a*, a second cleat clamping portion 330*b* and a third cleat clamping portion 330*c*. The third cleat clamping portion 330*c* is offset from the second cleat clamping portion 330*b* along the rotational center axis C1 direction. In the modified example, the third cleat clamping portion 330*c* is integrally formed with the pedal main body 322 and does not rotate with respect to the pedal main body 322. With this, the rigidity of the third cleat clamping portion 330*c* that is disposed on the outside of the bicycle can be increased, so that the third cleat clamping portion 330*c* is less likely to be damaged when falling.

The clamp part 324 also comprises a first biasing member 338*a* with the same configuration as that of the third embodiment, as well as a second biasing member 338*b* (refer to FIG. 14). The first biasing member 338*a* biases the first cleat clamping portion 330*a* in a direction that retains the cleat 50. The second biasing member 338*b* biases the second cleat clamping portion 330*b* in a direction that retains the cleat 50.

As shown in FIG. 14, the first cleat clamping portion 330*a*, the second cleat clamping portion 330*b*, and the third cleat clamping portion 330*c* are disposed in the peripheral portion 322*d* of the pedal main body 322. Specifically, the first cleat clamping portion 330*a* and the second cleat clamping portion 330*b* are separately disposed in a first mounting recess 322*e* and a second mounting recess 322*f* that are disposed in three corners of the pedal main body 322. The first mounting recess 322*e* and the second mounting recess 322*f* are formed to be recessed inwards in a roughly rectangular shape that extends through the first surface 322*a* and the second surface 322*b*.

The first cleat clamping portion 330*a* and the second cleat clamping portion 330*b* are disposed sandwiching the pedal shaft 20 so that the pedal shaft 20 extends between them in the same way as in the third embodiment. Also in the modified example, the third cleat clamping portion 330*c* is disposed in the intermediate position of the first cleat clamping portion 330*a* and the second cleat clamping portion 330*b* when seen from the rotational center axis C1 direction. That is, the third cleat clamping portion 330*c* is disposed on the rotational center axis C1 when seen in a plan view, as shown in FIG. 14. Additionally, the third cleat clamping portion 330*c* is disposed further on a side having the second end portion 20*b* than the first cleat clamping portion 330*a* or the second cleat clamping portion 330*b*. Therefore, the third cleat clamping portion 330*c*, the first cleat clamping portion 330*a* and the second cleat clamping portion 330*b* are disposed at an interval in the rotational center axis C1 direction (the lateral direction). Meanwhile, the first cleat clamping portion 330*a* and the second cleat clamping portion 330*b* can be disposed on a side having the second end portion 20*b*, and the third cleat clamping portion 330*c* can be disposed on a side having the first end portion 20*a*.

As shown in FIG. 14, the first cleat clamping portion 330*a* is rotatably provided around a first axis S1 by a first shaft member 40*a* that is disposed to the pedal main body 322 in the first mounting recess 322*e* along the first axis S1 direction. The first axis S1 extends in a direction that is parallel to the first surface 322*a*, as well as in a direction that intersects with a first straight line L1, which extends in the radial direction from the cleat rotational axis C2 toward the first cleat clamping portion 330*a*. Preferably, the first axis S1 extends in a direction that is essentially perpendicular to the first straight line L1.

The second cleat clamping portion 330*b* is rotatably provided around a second axis S2 by a second shaft member 40*b* that is disposed to the pedal main body 322 in the second mounting recess 322*f* along the second axis S2 direction. The second axis S2 extends in a direction that is parallel to the first surface 322*a*, as well as in a direction that intersects with a second straight line L2, which extends in the radial direction from the cleat rotational axis C2 toward the second cleat clamping portion 330*b*. Preferably, the second axis S2 extends in a direction that is essentially perpendicular to the second straight line L2. The second straight line L2 is disposed in a line symmetrically with the first straight line L1 with respect to the rotational center axis C1.

Figure 15:
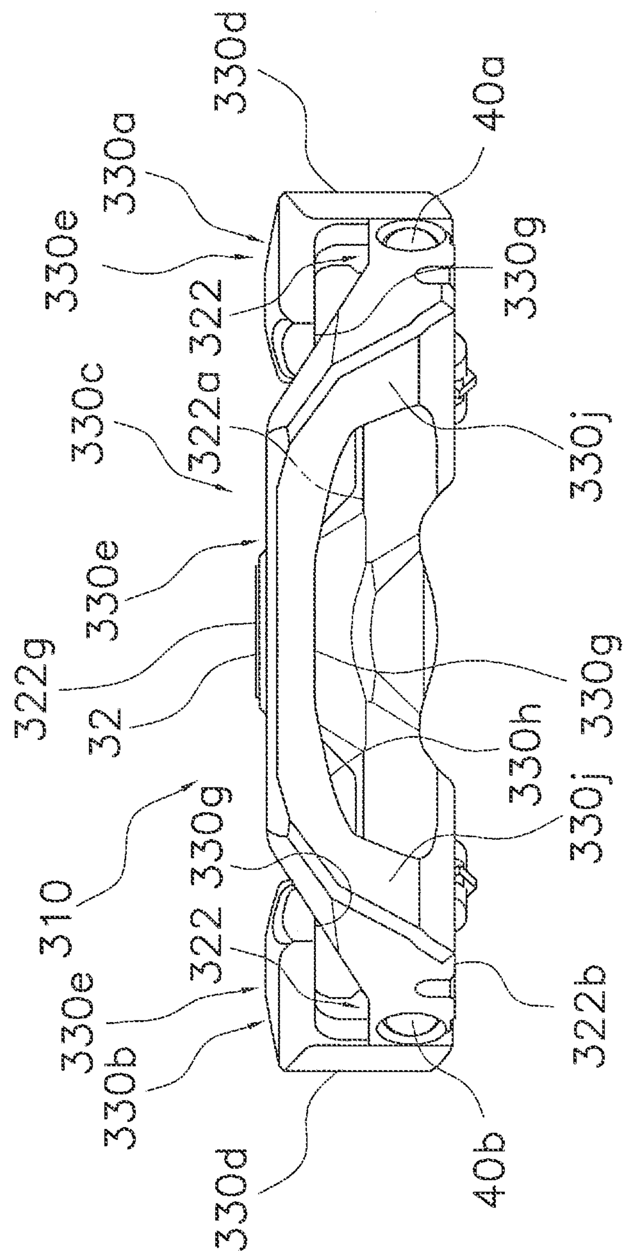
FIG. 15 is a front elevational view of the bicycle pedal illustrated in FIGS. 13 and 14 in accordance with the first modification of the third embodiment.

As shown in FIGS. 13, 14 and 15, the first cleat clamping portion 330*a* and the second cleat clamping portion 330*b* each comprise a main body portion 330*d* and a retaining portion 330*e* that retains the cleat 50. The main body portion 330*d* is rotatably supported by the pedal main body 322. The retaining portion 330*e* protrudes from the main body portion 330*d* toward the first protrusion 32 and is disposed with an interval that is able to retain the cleat 50 between the first surface 322*a*. As shown in FIG. 15, the retaining portions 330*e* of the first cleat clamping portion 330*a* and the second cleat clamping portion 330*b* each comprise an engagement surface 330*g* that is in contact with the cleat 50. The engagement surface 330*g* can be positioned between the first surface 322*a* and the endmost portion 322*g* of the first protrusion 32 in the direction that is perpendicular to the first surface 322*a*.

Each of the retaining portions 330*e* of the first cleat clamping portion 330*a* and the second cleat clamping portion 330*b* is biased in a direction toward the center (the first protrusion 32) of the pedal main body 322 by the first biasing member 338*a* and the second biasing member 338*b*, respectively. A guide surface 330*f* that inclines toward the first surface 322*a* is formed in the retaining portion 330*e*. The guide surface 330*f* is provided to pivot the retaining portion 330*e* in the opening direction (counterclockwise in FIG. 12) against the biasing force of the first biasing member 338*a* and the second biasing member 338*b* when the first cleat clamping portion 330*a* and the second cleat clamping portion 330*b* have been pressed with the cleat 50.

The first biasing member 338*a* and the second biasing member 338*b* are torsion coil springs made of a metal spring wire with a rectangular cross section. The first end portion of the first biasing member 338*a* is locked to the first cleat clamping portion 330*a*, and the second end portion is locked by an adjustment member that is not diagrammed for adjusting the spring force. In the same way, the first end portion of the second biasing member 338*b* is locked to the second cleat clamping portion 330*b*, and the second end portion is locked by an adjustment member that is not diagrammed for adjusting the spring force. The adjustment member is configured in the same way as in the third embodiment and is, for example, a cylindrical member. The spring force (the biasing force) of the first biasing member 338*a* and the second biasing member 338*b* are each changed by turning the adjustment member.

Figure 16:
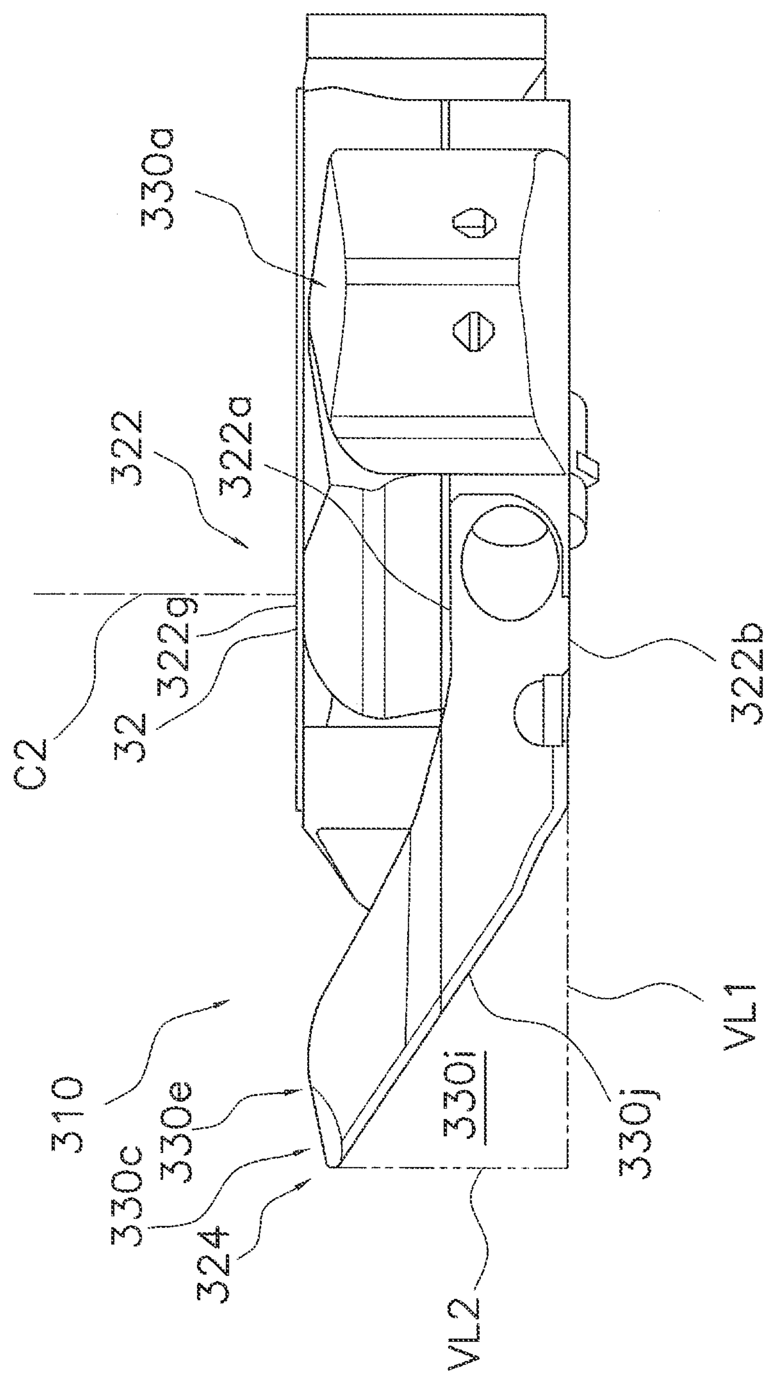
FIG. 16 is a right side elevational view of the bicycle pedal illustrated in FIGS. 13 to 15 in accordance with the first modification of the third embodiment.
Figure 17:
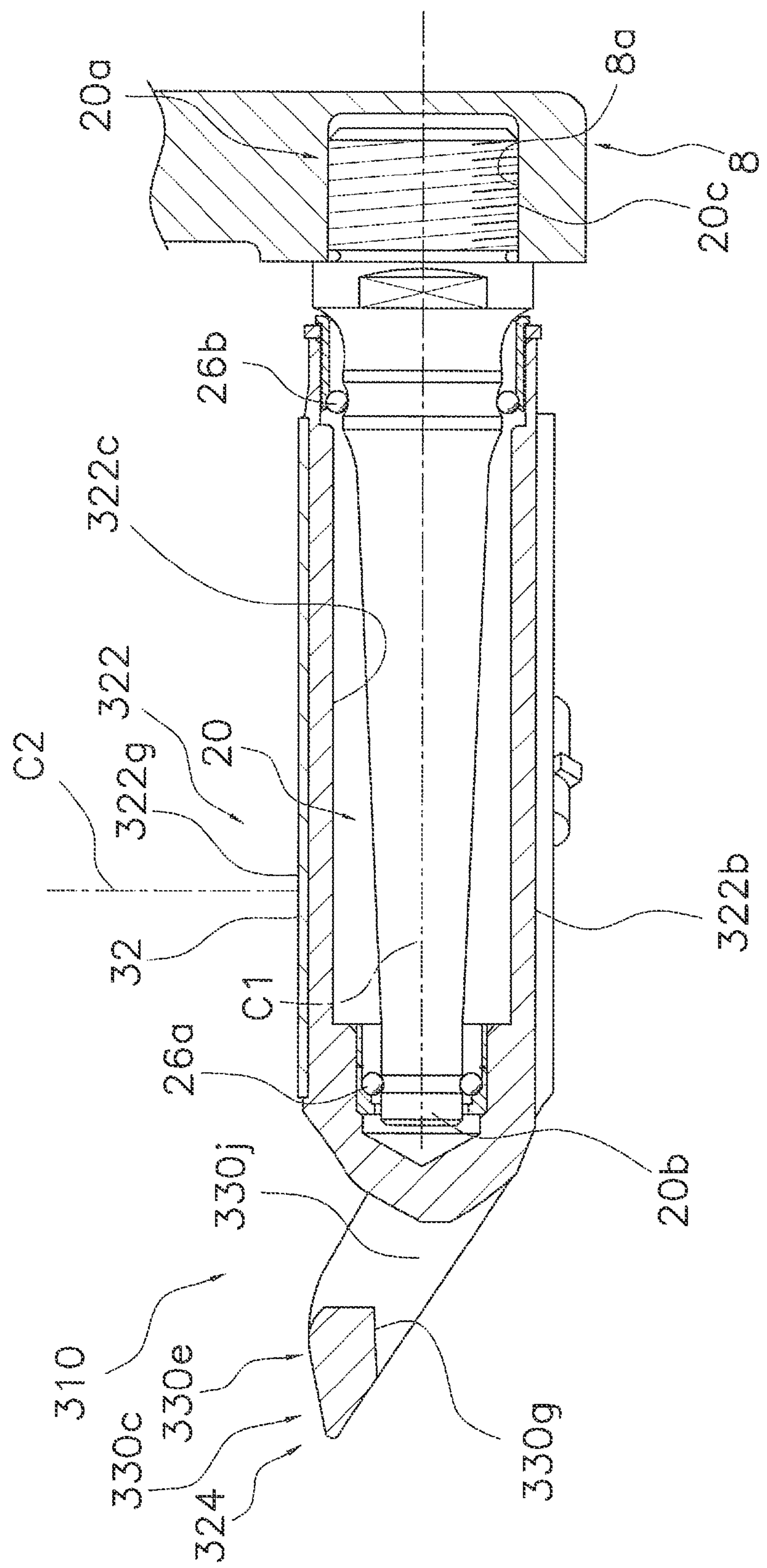
FIG. 17 is a cross-sectional view taken bicycle pedal illustrated in FIGS. 13 to 16 taken along the section line XVII in FIG. 14.

As shown in FIGS. 15 to 17, the third cleat clamping portion 330*c* is inclined with respect to the first surface 322*a* and extends in the rotational center axis C1 direction. The third cleat clamping portion 330*c* is integrally formed with the pedal main body 322. Therefore, the third cleat clamping portion 330*c* is non-rotatably coupled to the pedal main body 322. The third cleat clamping portion 330*c* comprises a pair of connecting portions 330*j* that are integrally formed with the pedal main body 322, retaining portions 330*e* that are integrally formed with the pair of connecting portions 330*j* and that are engageable with the cleat 50, and a recess 330*i* (refer to FIG. 16) that is formed in a portion that faces the retaining portions 330*e*. The connecting portions 330*j* connect the two ends of the retaining portion 330*e* and the pedal main body 322; more specifically, a pair of connecting portions 330*j* connects the two ends of the retaining portion 330*e* in the direction that is perpendicular to the rotational center axis C1 and the pedal main body 322. The connecting portions 330*j* are inclined with respect to the first surface 322*a* and extend along the rotational center axis C1 direction. Meanwhile, the connecting portions 330*j* are not limited to a shape that is inclined with respect to the first surface 332*a*, and they can be a shape that is parallel to the first surface 332*a* or a shape that is perpendicular to the first surface 332*a*.

The retaining portion 330*e* has a thickness that is less than the thickness of the pedal main body 322 in the topmost portion. Here, the thickness of the pedal main body 322 in the topmost portion is a thickness that passes through the first protrusion 32 in a direction that is perpendicular to the first surface 322*a*; specifically, this is the thickness of the endmost portion 322*g* of the first protrusion 32. The retaining portion 330*e* is disposed in a position that is away from the first surface 322*a* in a direction that intersects with the first surface 322*a*. The retaining portion 330*e* comprises an engagement surface 330*g* that contacts the cleat 50. The recess 330*i* is formed in a portion that faces the engagement surface 330*g*. As shown in FIG. 16, the recess 330*i* is surrounded by a first virtual line VL1, a second virtual line VL2, and the outline of the connecting portion 330*j*, and this recess is configured by a triangular space as viewed from the side surface side. The first virtual line VL1 extends from the distal end of the second surface 322*b* of the pedal main body 322 along the rotational center axis C1 direction. The second virtual line VL2 extends from the distal end of the retaining portion 330*e* toward the first virtual line VL1 along the cleat rotational axis C2 direction.

The engagement surface 330*g* is disposed in a position that is away from the first surface 322*a* in a direction that intersects with the first surface 322*a*. More specifically, the engagement surface 330*g* of the third cleat clamping portion 330*c* is positioned between the first surface 322*a* and the endmost portion 322*g* of the first protrusion 32 in the direction that is perpendicular to the first surface 322*a*, in the same way as the first cleat clamping portion 330*a* and the second cleat clamping portion 330*b*. With this, the position of the retaining surface of the attaching recess 58 of the first engagement portion 52, the second engagement portion 54, and the third engagement portion 56 of the cleat 50 will be in a position that is lower than the first protrusion 32 with respect to the first surface 322*a*. For this reason, the pedal can be configured to be thinner. The third cleat clamping portion 330*c* is formed between the retaining portion 330*e* and the pedal main body 322 and comprises an opening 330*h* into which the cleat 50 is inserted.

Attaching and Detaching Operation of the Cleat

In a bicycle pedal system 306 configured in this way, when attaching a shoe to the pedal 310, the shoe is disposed on the first surface 322*a* of the pedal main body 322 of the pedal 310 in a state in which the cleat 50 is attached to the shoes by a bolt member that is not diagrammed. Then, the third engagement portion 56 is engaged with the third cleat clamping portion 330*c* on the outside of the shoe (a side having the second end portion 20*b* of the pedal shaft 20). At this time, the retaining portion 330*e* of the third cleat clamping portion 330*c* that engages the third engagement portion 56 comprises an opening 330*h* that is formed in an arch shape and into which the cleat 50 is inserted, so that the third engagement portion 56 of the cleat 50 easily engages the engagement surface 330*g*.

In this state, if the inside of the shoe (a side having the first end portion 20*a* of the pedal shaft 20) strongly steps onto the pedal 310, the retaining portions 330*e* will open due to the action of the guide surface 330*f* of each of the retaining portions 330*e* of the first cleat clamping portion 330*a* and the second cleat clamping portion 330*b*; then, the first engagement portion 52 and the second engagement portion 54 of the cleat 50 will be separately clamped by the first cleat clamping portion 330*a* and the second cleat clamping portion 330*b*. In a state in which the cleat 50 is retained by the clamp part 324, the pair of abutting surfaces 50*d* will be in contact with and will be disposed to the side surfaces 32*a* of the first protrusion 32. At this time, the cleat 50 will engage the pedal 310 at three positions, and the gap between the first cleat clamping portion 330*a* and the third cleat clamping portion 330*c*, as well as the gap between the second cleat clamping portion 330*b* and the third cleat clamping portion 330*c*, can be made larger than the width of a conventional lever member that engages the pedal at one position in the rear. For this reason, in the modified example as well, the cleat 50 can be retained to the pedal 310 more stably than with the prior art. Additionally, the shoe to which the cleat 50 is attached becomes less likely to be tilted, and the pedaling force of the rider can be efficiently transmitted to the pedal 310. With this, the pedal 310 can be operated more stably and efficiently.

Additionally, the third cleat clamping portion 330*c* is inclined with respect to the first surface 322*a* and extends along the rotational center axis direction. A recess 330*i* is also formed in a portion that faces the engagement surface 330*g*. For this reason, a clearance for preventing the axial end portion of the second surface 322*b* of the pedal main body 322 of the pedal 310 from coming into contact with the ground while turning corners, etc., can be formed.

When detaching the shoe from the pedal 310, the heel side of the shoe is slightly twisted outside in the same way as in the third embodiment. Then, since the abutting surfaces 50*d* abuts the side surfaces 32*a* of the first protrusion 32, the shoe rotates about the cleat rotational axis C2. At this time, the abutting surfaces 50*d* slide along the side surfaces 32*a*. When the shoe rotates, the corner of the opposing surface of the first attaching portion 50*a* and the second attaching portion 50*b* of the cleat 50 will ride on the inclined surface 36. With this, the cleat 50 will separate from the first surface 322*a* of the pedal 210, and the first cleat clamping portion 330*a* and the second cleat clamping portion 330*b* will be pushed up and will be opened. As a result, the cleat 50 will be detached from the pedal 310, and the shoe can be detached from the pedal 310. By making the side surface shape of the abutting surfaces 50*d* and the side surfaces 32*a* spherical or conical, when the cleat 50 starts to separate from the first surface 322*a*, the cleat 50 will be moved in a direction that intersects with the cleat rotational axis C2 along the side surfaces 32*a*, and the cleat 50 can be easily detached from the pedal 310.

Other Embodiments (a) In the above-described embodiments, three or more cleat clamping portions were provided only to the first surface 22*a* (122*a*, 222*a*, or 322*a*), but the present invention is not limited to this configuration. Three or more cleat clamping portions can be provided to the second surface 22*b* (122*b*, 222*b*, or 322*b*) that is on the opposite side of the first surface 22*a* (122*a*, 222*a*, or 322*a*).

(b) In the above-described embodiments, at least two cleat clamping portions were rotatably provided to the pedal main body 22 (122, 222, or 322), but the present invention is not limited to this configuration. The only requirement is that at least one of the three cleat clamping portions is rotatable.

(c) In the above-described embodiment, the number of cleat clamping portions was three, but the present invention is not limited to this configuration. The number of cleat clamping portions can be any number that is three or more. However, in order to make the intervals in the cleat clamping portions large, the number of cleat clamping portions is preferably in a range of three to five.

(d) In the above-described embodiment, the side surfaces 32*a* (or 132*a*) of the first protrusion 32 (or 132) was conical shape, but this surface may have a spherical or cylindrical surface shape. Additionally, the abutting surfaces 50*d* (or 160) of the cleat 50 (or 150) had a conical shape, but this surface may have a spherical or cylindrical surface shape.

(e) In the above-described embodiment, a torsion coil spring was used as the biasing member, but the present invention is not limited to this configuration. However, the cleat clamping portion can be made to be elastics. Additionally, a spring member besides a torsion coil spring (for example, a leaf spring such as a torsion spring, a spring washer, or a coil spring) can also be used.

(f) In the third embodiment and the modified example, the third cleat clamping portions 230*c* and 330*c* were integrally formed with the pedal main bodies 222 and 322, but they may be formed separately. In this case, the third cleat clamping portions 230*c* and 330*c* can be non-rotatably coupled to the pedal main bodies 222 and 322; they also may be rotatably provided to the pedal main bodies 222 and 322.

(g) Besides the modified example of the third embodiment, the engagement surface 330*g* to which the cleat 50 (or 150) is in contact is not mentioned, but the present invention is not limited to this configuration. The retaining portion 30*e* (130*e*, or 230*e*) of the first cleat clamping portion 30*a* (130*a* or 230*a*), the second cleat clamping portion 30*b* (130*b* or 230*b*), and the third cleat clamping portion 30*c* (130*c* or 230*c*) of the first embodiment, the second embodiment, and the third embodiment of the present invention comprise the same engagement surface as the modified example. That is, the retaining portion 30*e* (130*e* or 230*e*) comprises an engagement surface that is positioned between the first surface 322*a* and the endmost portion of the first protrusion 32 in the direction that is perpendicular to the first surface 22*a* (122*a* or 222*a*).

(h) In the third embodiment, the recess 330*i* is configured by a space that is recessed in a triangular shape from the side view, but the recess of the present invention is not limited to this configuration. The recess may be a space that is configured by being recessed in a stepped shape from the side view, or this recess may be configured by a space that is recessed by being curved concavely or convexly.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle pedal that is detachable and engageable with a cleat that can be attached to a shoe, the bicycle pedal comprising:

a pedal shaft having a rotational center axis;

a pedal main body haying a first surface and a second surface, the second surface being on an opposite side of the first surface, and the pedal main body being rotatably supported by the pedal shaft around the rotational center axis, and a clamp part comprising a first cleat clamping portion, a second cleat clamping portion and a third cleat clamping portion that detachably retain the cleat on at least the first surface of the pedal main body, the third cleat clamping portion being spaced away from the second cleat clamping portion in a direction along the rotational center axis, the pedal shaft extending between the first cleat clamping portion and the second cleat clamping portion, the second and third cleat clamping portions being disposed on a same side with respect to the pedal shaft, the third cleat clamping portion being disposed between the first cleat clamping portion and the second cleat clamping portion as seen from the direction along the rotational center axis, and the third cleat clamping portion is disposed in a position that straddles the rotational center axis as seen from a direction that is perpendicular to the first surface.

2. The bicycle pedal as recited in claim 1, wherein the pedal shaft comprises a first end portion that is attached to a bicycle crank, and a second end portion that is on an opposite side of the first end portion with respect to the rotational center axis, and the third cleat clamping portion is disposed adjacent the second end portion of the pedal shaft, and the first and the second cleat clamping portions are disposed adjacent the first end portion of the pedal shaft.

3. The bicycle pedal as recited in claim 1, wherein the third cleat clamping portion comprises a retaining portion that is engageable with the cleat, and a recess that faces the retaining portion.

4. The bicycle pedal as recited in claim 3, wherein the retaining portion is disposed in a position that is offset from the first surface in a direction that intersects with the first surface.

5. The bicycle pedal as recited in claim 4, wherein the retaining portion has a thickness that is less than a thickness of the pedal main body in a topmost portion.

6. The bicycle pedal as recited in claim 4, wherein the retaining portion comprises an engagement surface that is configured to contact the cleat, and the recess is formed in a portion that faces the engagement surface.

7. The bicycle pedal as recited in claim 6, wherein the engagement surface is disposed in a position that is offset from the first surface in a direction that intersects with the first surface.

8. The bicycle pedal as recited in claim 3, wherein the third cleat clamping portion comprises a connecting portion that connects the retaining portion and the pedal main body, and the connecting portion is inclined with respect to the first surface and extends along the rotational center axis direction.

9. The bicycle pedal as recited in claim 8, wherein the connecting portion connects two ends of the retaining portion and the pedal main body.

10. The bicycle pedal as recited in claim 3, wherein the third cleat clamping portion is integrally formed with the pedal main body.

11. The bicycle pedal as recited in claim 3, wherein the retaining portion and the pedal main body are arranged to define an opening between the retaining portion and the pedal main body and into which the cleat is inserted.

12. The bicycle pedal as recited in claim 3, wherein the third cleat clamping portion is non-rotatably coupled to the pedal main body.

13. The bicycle pedal as recited in claim 1, wherein at least one of the first cleat clamping portion, the second cleat clamping portion, and the third cleat clamping portion is rotatably coupled to the pedal main body.

14. The bicycle pedal as recited in claim 13, wherein the first cleat clamping portion, the second cleat clamping portion, and the third cleat clamping portion are rotatably coupled to the pedal main body.

15. The bicycle pedal as recited in claim 13, wherein the clamp part comprises three biasing members that bias the first cleat clamping portion, the second cleat clamping portion, and the third cleat clamping portion in a direction that retains the cleat.

16. The bicycle pedal as recited in claim 1, wherein the pedal main body comprises a first protrusion that protrudes from the first surface.

17. The bicycle pedal as recited in claim 16, wherein the first protrusion comprises a partially spherical or conical side surface.

18. The bicycle pedal as recited in claim 16, wherein the pedal main body comprises a second protrusion that protrudes from the first surface and that extends along the rotational center axis.

19. The bicycle pedal as recited in claim 18, wherein the first protrusion is provided in an intermediate portion of the second protrusion with respect to the rotational center axis and protrudes with respect to a side surface of the second protrusion.

20. The bicycle pedal as recited in claim 18, wherein the pedal main body comprises an inclined surface that inclines in a direction away from the pedal shaft from the second protrusion to the first surface.

21. The bicycle pedal as recited in claim 20, wherein the pedal shaft comprises a first end portion that is attached to a bicycle crank, and a second end portion that is on the opposite side of the first end portion with respect to the rotational center axis, and the inclined surface is provided on a side of the first protrusion having the first end portion with respect to the first protrusion.

22. The bicycle pedal as recited in claim 16, wherein the first cleat clamping portion, the second cleat clamping portion, and the third cleat clamping portion each comprise an engagement surface that is configured to contact the cleat, and the engagement surface is positioned between the first surface and an endmost portion of the first protrusion in a direction that is perpendicular to the first surface.

23. The bicycle pedal as recited in claim 1, wherein the first cleat clamping portion, the second cleat clamping portion, and the third cleat clamping portion are disposed on a peripheral portion of the pedal main body.

24. A bicycle pedal system comprising:

the bicycle pedal as recited in claim 1, and a cleat that detachably engages the clamp part of the pedal main body of the bicycle pedal, the cleat comprising:

a first engagement portion configured to detachably engage the clamp part, a second engagement portion configured to detachably engage the clamp part in a position that is on an opposite side of the first engagement portion, with respect to the pedal shaft of the bicycle pedal, and a third engagement portion configured to detachably engage the clamp part in a position away from the second engagement portion in the direction of the rotational center axis of the pedal shaft.

25. The cleat as recited in claim 24, wherein the third engagement portion is configured to engage the clamp part on a side having the second engagement portion with respect to the pedal shaft.

26. The cleat as recited in claim 24, wherein the third engagement portion is configured to engage the clamp part in a position between the first engagement portion and the second engagement portion as seen along the rotational center axis.

27. The cleat as recited in claim 24, further comprising an abutting surface that abuts a part of the pedal main body, the abutting surface partially forming a spherical shape or a conical shape.

28. The cleat as recited in claim 24, wherein the first engagement portion, the second engagement portion, and the third engagement portion are provided on a peripheral portion of the cleat.

29. A bicycle pedal that is detachable and engageable with a cleat that can be attached to a shoe, the bicycle pedal comprising:

a pedal shaft having a rotational center axis;

a pedal main body having a first surface and a second surface, the second surface being on an opposite side of the first surface, and the pedal main body being rotatably supported by the pedal shaft around the rotational center axis, and a clamp part comprising a first cleat clamping portion, a second cleat clamping portion and a third cleat clamping portion that detachably retain the cleat on at least the first surface of the pedal main body, the third cleat clamping portion being spaced away from the second cleat clamping portion in a direction along the rotational center axis, the pedal shaft extending between the first cleat clamping portion and the second cleat clamping portion, at least one of the first cleat clamping portion, the second cleat clamping portion, and the third cleat clamping portion being rotatably coupled to the pedal main body, and the clamp part comprising three biasing members that bias the first cleat clamping portion, the second cleat clamping portion, and the third cleat clamping portion in a direction that retains the cleat.

30. A bicycle pedal that is detachable and engageable with a cleat that can be attached to a shoe, the bicycle pedal comprising:

a pedal shaft having a rotational center axis;

a pedal main body having a first surface and a second surface, the second surface being on an opposite side of the first surface, and the pedal main body being rotatably supported by the pedal shaft around the rotational center axis, and a clamp part comprising a first cleat clamping portion, a second cleat clamping portion and a third cleat clamping portion that detachably retain the cleat on at least the first surface of the pedal main body, the pedal main body comprising a first protrusion that protrudes from the first surface, and the first protrusion comprising a partially spherical or conical side surface.

31. A bicycle pedal that is detachable and engageable with a cleat that can be attached to a shoe, the bicycle pedal comprising:

a pedal shaft having a rotational center axis;

a pedal main body having a first surface and a second surface, the second surface being on an opposite side of the first surface, and the pedal main body being rotatably supported by the pedal shaft around the rotational center axis, and a clamp part comprising a first cleat clamping portion, a second cleat clamping portion and a third cleat clamping portion that detachably retain the cleat on at least the first surface of the pedal main body, the pedal main body comprising a first protrusion that protrudes from the first surface and a second protrusion that protrudes from the first surface and extends along the rotational center axis, and the first protrusion being provided in an intermediate portion of the second protrusion with respect to the rotational center axis and protruding with respect to a side surface of the second protrusion.

* * * * *